(12) United States Patent
Su

(10) Patent No.: US 12,003,746 B2
(45) Date of Patent: Jun. 4, 2024

(54) JOINT FORWARD AND BACKWARD NEURAL NETWORK OPTIMIZATION IN IMAGE PROCESSING

(71) Applicant: DOLBY LABORATORIES LICENSING CORPORATION, San Francisco, CA (US)

(72) Inventor: Guan-Ming Su, Fremont, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 98 days.

(21) Appl. No.: 17/800,886

(22) PCT Filed: Feb. 17, 2021

(86) PCT No.: PCT/US2021/018407
§ 371 (c)(1),
(2) Date: Aug. 18, 2022

(87) PCT Pub. No.: WO2021/168001
PCT Pub. Date: Aug. 26, 2021

(65) Prior Publication Data
US 2023/0084705 A1 Mar. 16, 2023

Related U.S. Application Data

(60) Provisional application No. 62/978,638, filed on Feb. 19, 2020.

(30) Foreign Application Priority Data

Feb. 19, 2020 (EP) ..................................... 20158278

(51) Int. Cl.
*H04N 19/436* (2014.01)
*H04N 19/119* (2014.01)
(Continued)

(52) U.S. Cl.
CPC ......... *H04N 19/436* (2014.11); *H04N 19/119* (2014.11); *H04N 19/136* (2014.11); *H04N 19/186* (2014.11)

(58) Field of Classification Search
CPC .. H04N 19/436; H04N 19/119; H04N 19/136; H04N 19/186; H04N 19/30; H04N 19/46; H04N 19/117
(Continued)

(56) References Cited

U.S. PATENT DOCUMENTS 5,376,962 A 12/1994 Zortea
7,180,629 B1 2/2007 Nishio
(Continued)

FOREIGN PATENT DOCUMENTS

CN 108681991 A 10/2018
CN 110197463 A 9/2019
(Continued)

OTHER PUBLICATIONS

Kim, Soo Ye, et al."A multi-Purpose Convolutional Neural Network for Simultaneous Super-Resolution and High Dynamic Range Image Reconstruction" Springer Nature Switzerland, ACCV 2018, pp. 379-394, 2019.

(Continued)

*Primary Examiner* — Susan E. Torgerson

(57) ABSTRACT

A source color grade and a destination color grade may be received by an end-to-end image mapping pipeline comprising forward and backward paths. Forward neural networks in the forward path may be applied to generate, from the source color grade, a forward reshaped color grade corresponding to the destination color grade. Backward neural networks in the backward path may be applied to generate, from the forward reshaped color grade, a backward reshaped color grade corresponding to the source color grade. An (Continued)

overall neural network cost function may be specified for the forward path and the backward path to generate a cost that may be used as a basis for determining operational parameters for the forward and backward neural networks.

15 Claims, 8 Drawing Sheets

(51) Int. Cl.
*H04N 19/136* (2014.01)
*H04N 19/186* (2014.01)

(58) Field of Classification Search
USPC .......................................................... 375/240
See application file for complete search history.

(56) References Cited

U.S. PATENT DOCUMENTS

| | | | |
|---|---|---|---|
| 7,221,807 B2 | 5/2007 | Campbell | |
| 7,512,861 B2 | 3/2009 | Brajovic | |
| 9,826,149 B2 | 11/2017 | Chalom | |
| 10,080,026 B2 | 9/2018 | Su | |
| 10,091,479 B2 | 10/2018 | Barron | |
| 10,264,287 B2 | 4/2019 | Wen | |
| 10,397,576 B2 * | 8/2019 | Kadu | G06T 5/40 |
| 10,652,588 B2 * | 5/2020 | Kerofsky | H04N 19/98 |
| 10,701,375 B2 * | 6/2020 | Su | H04N 19/102 |
| 11,361,506 B2 * | 6/2022 | Su | G06T 5/92 |
| 2016/0286226 A1 | 9/2016 | Ridge | |
| 2016/0286241 A1 | 9/2016 | Ridge | |
| 2018/0007392 A1 | 1/2018 | Lasserre | |
| 2018/0047367 A1 | 2/2018 | Stauder | |
| 2018/0192077 A1 | 7/2018 | Olivier | |
| 2019/0026600 A1 | 1/2019 | Bagherinezhad | |
| 2019/0043177 A1 | 2/2019 | Nishimura | |
| 2019/0043178 A1 | 2/2019 | Chen | |
| 2019/0075301 A1 | 3/2019 | Chou | |
| 2019/0082186 A1 | 3/2019 | Van Der Vleuten | |
| 2019/0104309 A1 | 4/2019 | Su | |
| 2019/0110054 A1 | 4/2019 | Su | |
| 2019/0222866 A1 | 7/2019 | Song | |
| 2019/0281325 A1 | 9/2019 | Song | |
| 2019/0325567 A1 | 10/2019 | Jones | |
| 2021/0150812 A1 | 5/2021 | Su | |

FOREIGN PATENT DOCUMENTS

| | | |
|---|---|---|
| WO | 02099367 W | 12/2002 |
| WO | 2018049335 A1 | 3/2018 |
| WO | 2019112085 A1 | 6/2019 |
| WO | 2019169174 A1 | 9/2019 |
| WO | 2019199701 A1 | 10/2019 |
| WO | 2019217751 A1 | 11/2019 |

OTHER PUBLICATIONS

Lu, T. et al. "HDR CE2: CE2.A-2, CE2.C, CE2.D and CE2.E-3" JCT-VC of ITU-T Feb. 19-26, 2016.

Buckler, M. et al "Reconfiguring the Image Pipeline for Computer Vision" IEEE International Conference on Computer Visiona, pp. 975-984, 2017.

Hirao, K. et al. "Convolutional Neural Network Based Inverse Tone Mapping for High Dynamic Range Display using Lucore" IEEE International Conference on Consumer Electronics, Jan. 11, 2019, pp. 1-2.

ITU-R BT.2100 "Image Parameter Values for High Dynamic Range Television for Use in Production and International Programme Exchange" ITU, Jun. 2017.

ITU-R Recommendation ITU-R BT.1886 "Reference Electro-Optical Transfer Function for Flat Panel Displays Used in HDTV Studio Production" Mar. 2011, pp. 1-7.

Iwahashi, M. et al "Efficient Lossless Bit Depth Scalable Coding for HDR Images" Proc of the 2012 Asia Pacific Signal and Information Processing Association Annual Summit and Conference, 2012.

Kim, Dae-Eun, et al "Learning-Based Low-Complexity Reverse Tone Mapping with Linear Mapping" IEEE Transactions on Circuits and Systems for Video Technology, vol. 30, Issue 2, Feb. 2020.

Le Pendu, M. et al "Rate Distortion Optimized Tone Curve for High Dynamic Range Compression" 22nd European Signal Processing Conference, Sep. 1-5, 2014.

SMPTE 2084:2014 "High Dynamic Range Electro-Optical Transfer Function of Mastering Reference Displays" Aug. 16, 2014.

Yang, X. et al "Image Correction Via Deep Reciprocating HDR Transformation" CVF Conference on Computer Vision and Pattern Recognition, 2018.

* cited by examiner

JOINT FORWARD AND BACKWARD NEURAL NETWORK OPTIMIZATION IN IMAGE PROCESSING

CROSS-REFERENCE TO RELATED APPLICATIONS

This application claims priority to U.S. Provisional Application No. 62/978,638 and European Patent Application No. 20158278.0, both filed on Feb. 19, 2020, each of which is incorporated by reference in its entirety.

TECHNOLOGY

The present disclosure relates generally to image processing operations. More particularly, an embodiment of the present disclosure relates to video codecs.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. While perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization.

The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). An example of such an EOTF is defined in SMPTE 2084 and Rec. ITU-R BT.2100, "*Image parameter values for high dynamic range television for use in production and international programme exchange,*" (June 2017). As appreciated by the inventors here, improved techniques for composing video content data that can be used to support display capabilities of a wide variety of SDR and HDR display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
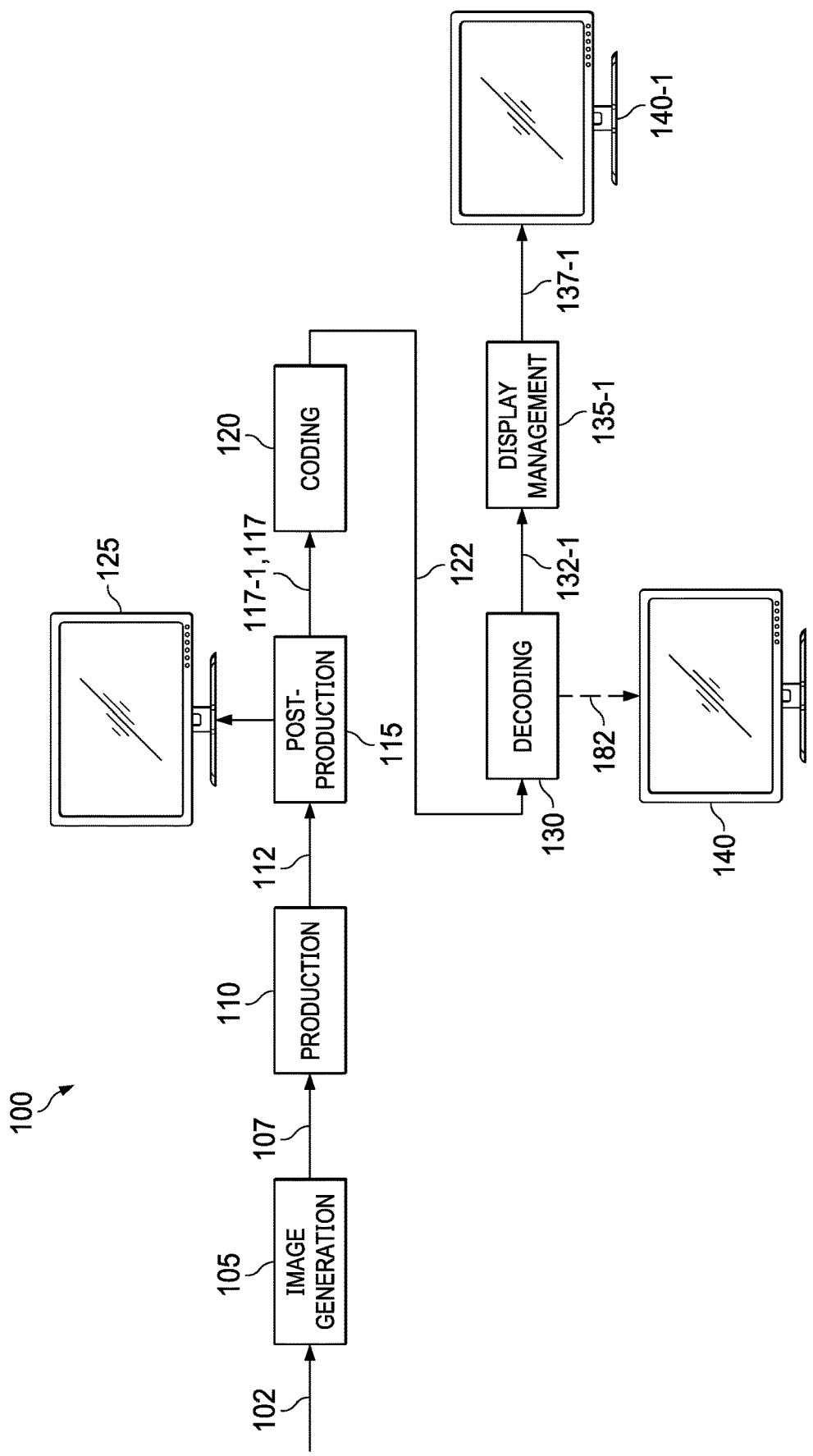
FIG. 1 depicts an example process of a video delivery pipeline.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily occluding, obscuring, or obfuscating the present disclosure.

Summary

A joint forward and backward neural network optimization framework is described herein. The framework can be implemented in a wide variety of video delivery and display applications including but not limited to those supporting single-layer backward compatible (SLBC) codec.

Under some approaches, a forward reshaping path that generates a forward reshaped (e.g., SDR, etc.) color grade from a source (e.g., HDR, etc.) color grade and a backward reshaping path that generates reconstructed images for a destination or source (e.g., SDR, HDR, etc.) color grade are optimized separately. For example, in generating forward mapping at the encoder side that maps the source color grade to a destination color grade, quality considerations for the source grade mapped back from the destination color grade by backward mapping at the decoder side is not incorporated into the optimization problem formulation for the forward mapping. Hence, while the forward mapping may be optimized, the backward mapping may not be optimized.

Separate optimizations (or individual optimizations) in the forward and backward reshaping paths may be beneficial in light of highly non-linear structures in luma (e.g., 8-piece 2nd order polynomial set, etc.) and chroma image content mappings employed to map between different color grades in the forward and backward reshaping paths. However, separate optimizations in the forward and backward reshaping paths may cause an end-to-end optimization problem that combines both the forward and backward reshaping paths to be relatively difficult to build, much less to produce a closed form solution for the end-to-end optimization problem. Separate optimizations in the forward and backward reshaping paths may also cause a desired tradeoff between the forward reshaping path and the backward reshaping path to be difficult to strike. As a result, it is likely that predicted (e.g., SDR, HDR, etc.) images from both the forward and backward reshaping paths that are optimized separately may be suboptimal.

In contrast, under techniques as described herein, neural network based solutions can be used to provide much better fitting in each of the forward and backward paths, taking advantage of the fact that neural networks are universal function approximators. Moreover, layer-wise structures of neural networks can be used to concatenate both the forward and backward paths together to form an end-to-end video delivery and/or consumption system comprising the neural networks in both the forward and backward paths. Feedbacks such as errors or costs from the backward path can be provided to the forward path under the joint forward and backward path optimization approach. A cost function (or a loss function) in a joint forward and backward path optimization problem can be set up in a way that comprises separate cost contributions (or separate loss contributions) from the forward reshaping path and from the backward reshaping. These separate cost contributions in the loss function can be assigned or weighted with different weighting factors so as to adjust qualities of the forward and backward paths according to a desired tradeoff. As a result, operational parameters for these neural networks used in the end-to-end video delivery and/or consumption system can be obtained as an overall solution to a joint optimization problem of the concatenated forward and backward paths.

Additionally, optionally or alternatively, some or all of these techniques can be extended to cover a variety of image processing/rendering applications, for example, to allow single-layer progressive (SLPC) codecs to incorporate neural network based solutions for optimizing video qualities with respect to multiple different color grades.

Neural networks as described herein can be used to generate a set of corresponding images that depict the same scene (or the same semantic content) at different dynamic range levels, different color spaces (or different color gamuts), and so forth. Some or all of these neural networks with operational parameters generated under the joint optimization framework may be used to map one image in the set of corresponding images to other images in the same set of corresponding images.

An image of a specific dynamic range level, a specific color space (or a specific color gamut), etc., in the set of corresponding images of different dynamic range levels, different color space sizes (or different color gamuts), etc., may be coded as base layer (BL) image data in a coded bitstream along with image metadata specifying some or all of the operational parameters of some or all of the forward and/or backward neural networks. The base layer (BL) image data and the image metadata can be provided to recipient decoding and playback devices, which may directly render the BL image data after decoding on displays supporting rendering images in the specific dynamic range level, the specific color space, etc. Additionally, optionally or alternatively, the BL image data and the image metadata can be provided to recipient decoding and playback devices, which may reconstruct image data at a different dynamic range level, a different color space (or a different color gamut) from the decoded BL image data and image metadata and render the reconstructed image data on displays supporting rendering images in the different dynamic range level, different color space (or different color gamut).

As a result, image data coded in a coded bit stream for rendering with some display devices can be used to generate reconstructed image data for rendering with some other display devices without needing to include other image data specifically coded for the other display devices in the coded bit stream. Thus, a wide variety of display device types with a wide variety of image rendering capabilities may be supported by coded streams generated under techniques as described herein.

Example embodiments described herein relate to generating and encoding image metadata for image reconstruction. A source image of a source color grade and a destination image of a destination color grade are received as input to an end-to-end image mapping pipeline comprising a forward path comprising one or more forward neural networks and a backward path comprising backward neural networks. The one or more forward neural networks in the forward path are applied to forward reshape the source image of the source color grade to generate a forward reshaped image of the destination color grade. The one or more backward neural networks in the backward path are applied to backward reshape the forward reshaped image of the destination color grade to generate a backward reshaped image of the source color grade. A (joint) neural network cost function is specified for the forward path and the backward path. The neural network cost function comprises a forward cost portion (e.g. a forward cost term) that computes a first difference between the forward reshaped image and the destination image and a backward cost portion (e.g. a backward cost term) that computes a second difference between the backward reshaped image and the source image. Operational parameters for the one or more forward neural networks and for the one or more backward neural networks are determined by back propagation using the neural network cost function, e.g. by computing a cost as the output of the neural network cost function and using the computed costs in back propagation. Optionally, image data of a selected color grade, as generated from the forward path, is encoded in a video signal along with image metadata. The image metadata comprises at least a subset of operational parameters for a subset of the one or more forward neural networks and/or the one or more backward neural networks. This enables a recipient device of the video signal to use the image metadata and the image data of the selected color grade to generate reconstructed image data of a different color grade.

Example embodiments described herein relate to decoding image metadata for image reconstruction and rendering. Image data of a color grade, generated from a forward path implemented in an upstream video encoder, is decoded from a video signal along with image metadata. The image metadata comprises at least a subset of operational parameters for a subset of one or more forward neural networks in the forward path and/or one or more backward neural networks in a corresponding backward path implemented in the upstream encoder. The subset of the one or more forward neural networks and/or the one or more backward neural networks with the subset of operational parameters is applied to the image data of the color grade to generate reconstructed image data of a different color grade. A display image derived from the reconstructed image of the different color grade is caused to be rendered with a display device.

Example Video Delivery Processing Pipeline

FIG. 1 depicts an example process of a video delivery pipeline (100) showing various stages from video capture to video content display. A sequence of video frames (102) is captured or generated using image generation block (105). Video frames (102) may be digitally captured (e.g. by a digital camera, etc.) or generated by a computer (e.g. using computer animation, etc.) to provide video data (107). Additionally, optionally or alternatively, video frames (102) may be captured on film by a film camera. The film can be converted to a digital format to provide the video data (107). In a production phase (110), the video data (107) is edited to provide a video production stream (112).

The video data of the production stream (112) is then provided to a processor for post-production editing (115). The post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, manual and/or automatic scene cut information generation, image cropping, addition of computer-generated visual special effects, etc.) may be performed at the post-production editing (115) to yield one, two or more color grades of images through content mapping and/or color grading. These color grades comprise sets of corresponding images depicting the same scenes or semantic contents, but may differ in one or more of: different dynamic range levels, different color spaces, different EOTFs, different color space types, etc.

The color grades may comprise a source color grade and one or more destination color grades. Each of the source and destination color grades depicts the same set of visual scenes or semantic contents. The destination color grades may be derived from the source color grade through content mapping and/or color grading performed manually, automatically or a combination of manual and automatic image processing operations. In some operational scenarios, during post-production editing (115), some or all of the color grades of images are viewed and color graded, for example by colorists, on different reference displays that respectively support (e.g., direct, etc.) rendering of the images at different dynamic range levels, different color spaces, different EOTFs, different color space types, etc.

For the purpose of illustration only, the color grades include a color grade of HDR images (117-1) or SDR (or relatively narrow dynamic range) images (117) (e.g., SDR, etc.). The SDR images (117) may be content mapped from the HDR images (117-1). In some embodiments, during post-production editing (115), the HDR images (117-1) are viewed on a reference HDR display that supports the high dynamic range by a colorist who is performing post-production editing operations on the HDR images (117-1). Additionally, optionally or alternatively, during post-production editing (115), the SDR images (117) are viewed on a reference display (125) that supports the standard dynamic range (or a relatively narrow dynamic range) by a colorist who is performing post-production editing operations on the SDR images (117).

The coding block (120) may implement some or all joint forward and backward neural network optimization operations as described herein to generate multiple sets of operational parameters for forward and/or backward neural networks used to map between or among the source and destination color grades of images. The forward reshaped SDR images can be compressed/encoded by the coding block (120) into a coded bitstream (122). The multiple sets of operational parameters for the forward and/or backward neural networks may be included or encoded in the same coded bitstream as a part of image metadata.

By way of example but not limitation, the HDR images (117-1) may represent the source color grade, whereas the SDR images (117) may represent one of the destination color grades. The coding block (120) receives the HDR images (117-1) from the post-production editing (115), and forward reshapes the HDR images (117-1) into (forward) reshaped SDR images. The forward reshaped SDR images may closely approximate the SDR images (117) from color grading operations. The coding block (120) generates a coded bitstream that includes SDR images (e.g., forward reshaped SDR images, etc.) and image metadata comprising a set of operational parameters for neural networks used by a recipient device of the coded bitstream to reconstruct HDR image from the SDR images.

The coding block (120) may include audio and video encoders, such as those defined by ATSC, DVB, DVD, Blu-Ray, and other delivery formats, to generate the coded bitstream (122).

In some operational scenarios, the coded bitstream (122) may represent a video signal (e.g., an 8-bit SDR video signal, a 10-bit SDR video signal, etc.) that is backward compatible with a wide variety of SDR display devices (e.g., SDR displays, etc.). In a non-limiting example, the video signal encoded with the reshaped SDR images may be a single-layer backward compatible video signal. Here, a "single-layer backward compatible video signal" may refer to a video signal that carries SDR images that are specifically optimized or color graded for SDR displays in a single signal layer. Example single layer video coding operations are described in U.S. Patent Application Publication No. 2019/0110054, "Encoding and decoding reversible production-quality single-layer video signals," by G-M. Su et al., the entire contents of which are hereby incorporated by reference as if fully set forth herein.

The multiple sets of operational parameters for the forward and/or backward neural networks may be decoded and used in prediction operations by a recipient device of the video signal or coded bitstream to generate reconstructed images of other color grade(s) from the decoded images of one color grade. One or more different video quality levels may be generated for the reconstructed images using prediction operations (e.g., backward reshaping operations, inverse tone mapping operations, etc.) with the multiple sets of operational parameters for the forward and/or backward neural networks as generated by the (upstream) coding block (120). These different video quality levels may respectively correspond to one or more different color grades (e.g., source and/or destination color grades, etc.) on the encoder side.

In some operational scenarios, the decoded images represent SDR images that were forward reshaped by an upstream video encoder (e.g., with the coding block (120), etc.) from the color graded HDR images (117-1) to approximate the color graded SDR images (117). The reconstructed images, as generated from the decoded images using the neural networks with a corresponding set of operational parameters in the image metadata transmitted in the coded bitstream (122), represent HDR images approximating the color graded HDR images (117-1) on the encoder side.

In some operational scenarios, (input) color grades that serve (or are given) as input to a video encoding (e.g., the coding block (120), etc.) for the purpose of generating a coded bitstream (e.g., 122, etc.) may be ordered or arranged in a specific order. For example, one of the color grades may be designated as a source color grade serving as an input or a starting point to a sequence of (e.g., ordered, etc.) forward neural networks. The remaining (input) color grades may be ordered into a sequence of destination color grades. The source color grade may be forward reshaped by the sequence of forward neural networks to generate a sequence of forward reshaped color grades corresponding to the sequence of destination color grades. Each forward reshaped color grade in the sequence of forward reshaped color grades corresponds to (or is the same as) a respective destination color grade in the sequence of destination color grades. A used herein, a forward neural network refers to a neural network in the sequence of forward neural networks that reshapes or converts EITHER the given source color grade OR a preceding forward reshaped color grade to a forward reshaped color grade.

The sequence of forward neural networks may be followed by a corresponding sequence of backward neural networks to reconstruct images of the destination and source color grades. A backward neural network refers to a neural network that converts or backward reshapes EITHER forward reshaped images outputted by a forward neural network OR preceding backward reshaped images to generate reconstructed (or backward reshaped) images approximating images of a destination color grade or the source color grade. In some operational scenarios, while the sequence of forward neural networks successively converts or forward reshapes the source color grade into the sequence of forward reshaped color grades approximating the sequence of destination color grades, the corresponding sequence of backward neural networks successively reconstructs or backward reshapes output from the sequence of forward neural networks into reconstructed images approximating images of the sequence of destination color grade and the source color grade.

Example reshaping operations are described in U.S. Pat. No. 10,080,026, "Signal reshaping approximation," by G-M. Su et al., the entire content of which is hereby incorporated by reference as if fully set forth herein.

Additionally, optionally, or alternatively, the coded bitstream (122) is encoded with additional image metadata including but not limited to display management (DM) metadata that can be used by the downstream decoders to perform display management operations on decoded images or backward reshaped images to generate display images optimized for rendering on target displays.

The coded bitstream (122) is then delivered downstream to receivers such as decoding and playback devices, media source devices, media streaming client devices, television sets (e.g., smart TVs, etc.), set-top boxes, movie theaters, and the like. In a receiver (or a downstream device), the coded bitstream (122) is decoded by decoding block (130) to generate decoded images 182, which may be the same as images (e.g., forward reshaped SDR images, etc.) encoded by the coding block (120) into the bitstream (122), subject to quantization errors generated in compression performed by the coding block (120) and decompression performed by the decoding block (130).

In operational scenarios in which the receiver operates with (or is attached or operatively linked to) a target display 140 that supports rendering the decoded images (182), the decoding block (130) can decode the images (182) from (e.g., the single layer in, etc.) the coded bitstream (122), and use the decoded images (182) (e.g., forward reshaped SDR images, etc.) directly or indirectly for rendering on the target display (140).

In some operational scenarios, the target display (140) is of similar characteristics as the SDR reference display (125), and the decoded images (182) are forward reshaped SDR images directly watchable on the target display (140).

In some embodiments, the receiver operates with (or is attached or operatively linked to) a target display that has different display capabilities from those of a reference display for which the decoded images (182) were optimized. Some or all of the multiple sets of operational parameters for the forward and/or backward neural networks in the image metadata (or composer metadata) may be used to compose or reconstruct images from the decoded images (182) that are optimized for the target display.

For example, the receiver may operate with an HDR target display 140-1 that supports a high dynamic range (e.g., 100 nits, 200 nits, 300 nits, 500 nits, 1,000 nits, 4,000 nits, 10,000 nits or more, etc.) than that of the decoded images (182). The receiver can extract the image metadata from (e.g., metadata container(s) in, etc.) the coded bitstream (122), and use the multiple sets of operational parameters for the forward and/or backward neural networks in the image metadata (or composer metadata) to compose or reconstruct images 132-1 from the decoded images (182) such as forward reshaped SDR images.

In some operational scenarios, the reconstructed images (132-1) represent reconstructed HDR images optimized for viewing on an HDR (e.g., reference, etc.) display that is the same as, or comparable with, an HDR target display operating in conjunction with the receiver. The receiver may directly use the reconstructed images (132-1) for rendering on the HDR target display.

In some operational scenarios, the reconstructed images (132-1) represent reconstructed HDR images optimized for viewing on an HDR (e.g., reference, etc.) display that is not the same as an HDR target display (140-1) operating in conjunction with the receiver. A display management block (e.g., 135-1, etc.)—which may be in the receiver, in the HDR target display (140-1), or in a separate device—further adjusts the reconstructed images (132-1) to characteristics of the HDR target display (140-1) by generating a display-mapped signal (137-1) adapted to the characteristics of the HDR target display (140-1). Display images or the adjusted reconstructed images may be rendered on the HDR target display (140-1).

Joint Optimization Framework for SLBC

Under separate optimization approaches, predicted SDR images from source HDR images using forward reshaping (e.g., frequently many-to one HDR-to-SDR mapping, etc.) may be relatively free of visual artifacts in reference to the source HDR images. However, predicted/reconstructed HDR images from backward reshaping (e.g., frequently via one-to-many SDR-to-HDR mappings, etc.) decoded SDR images—which may be the same as the predicted SDR images subject to quantization or coding errors introduced in compression/encoding and decompression/decoding—may be relatively prone to containing visual artifacts in reference to either the source HDR images or the decoded SDR images. These artifacts from backward reshaping are caused by the one-to-many SDR-to-HDR mappings in the backward reshaping which map SDR pixel values to inaccurate HDR pixel values. These visual artifacts may not be prevented even using neural networks as universal function approximators so long as the forward and backward paths remain to be separately optimized.

In contrast, under joint forward and backward optimization approaches as described herein, the cost function can be used to ensure the (overall) end-to-end mapping from the forward path to the backward path is (or is close to within a) one-to-one. Thus, under techniques as described herein, a source pixel can be guided to go back to its original value through this end-to-end system or pipeline comprising both the forward and backward paths. By way of illustration but not limitation, joint forward and backward optimization techniques may be applied to allow SLBC codecs to incorporate neural network based solutions.

Figure 2A:
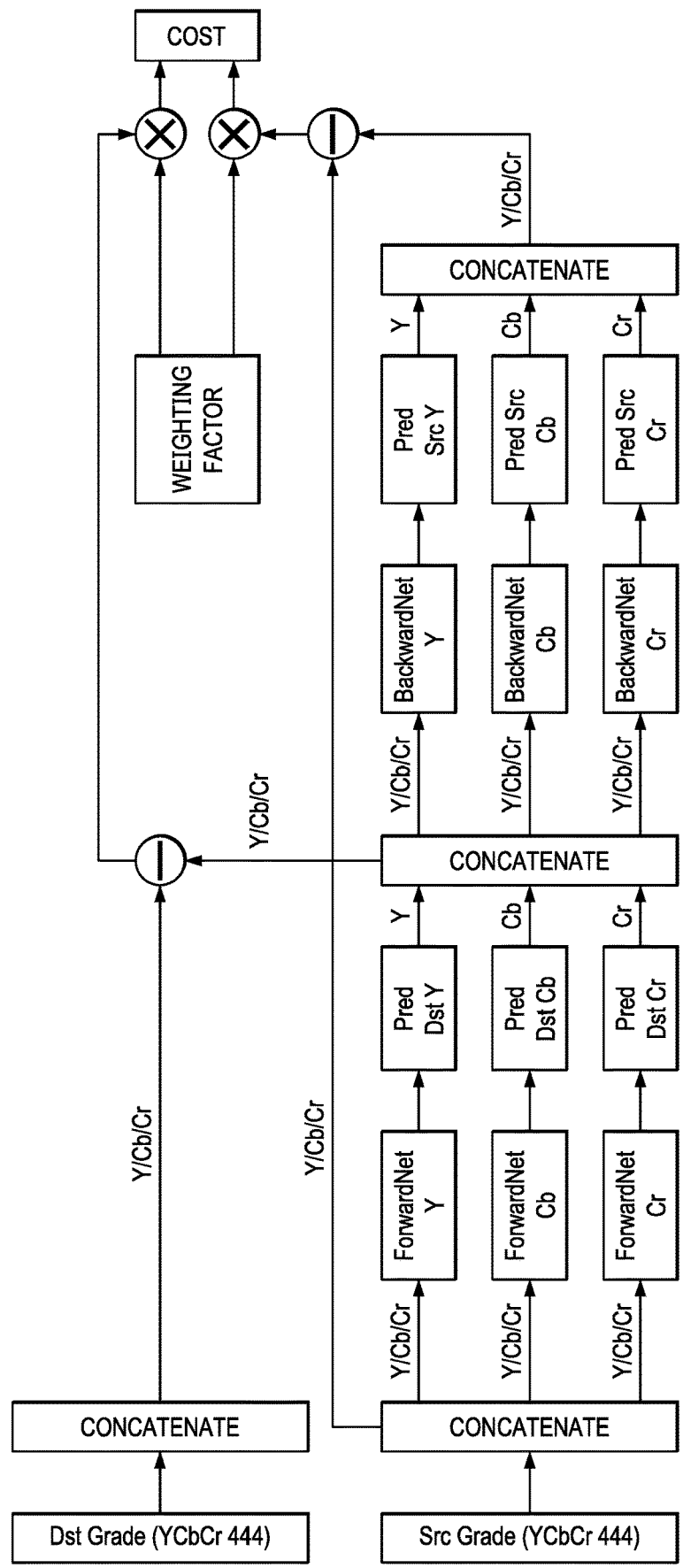
FIG. 2A illustrates an example joint forward and backward optimization framework for single layer backward compatible coding (SLBC)

FIG. 2A illustrates an example joint forward and backward optimization framework for SLBC coding. The framework may, but is not limited to, be implemented with a SLBC codec in one or more of: a video encoder, a video transcoder, a video streaming server, and so forth. As shown, input as received by the SLBC codec (e.g., the coding block (120) of FIG. 1, etc.) may comprise two different types of input images belonging to a source color grade (denoted as "Src Grade (YCbCr 444)", where "YCbCr" and "444" respectively refer to color space and color sampling format of the source color grade) and a destination color grade (denoted as "Dst Grade (YCbCr 444)", where "YCbCr" and "444" respectively refer to color space and color sampling format of the destination color grade), respectively.

For the purpose of illustration only, the input images to the SLBC codec may comprise an HDR image as an input image of the source color grade (e.g., an HDR color grade, etc.) and an SDR image as an input image of the destination color grade (e.g., an SDR color grade, etc.). Both the SDR and HDR images depicts the same scene (or the same visual semantic content) but at different quality levels such as different dynamic ranges.

The joint optimization framework is implemented by the SLBC codec to find (1) a forward reshaping function to convert the input image of the source color grade (or the HDR image in the present example) to a forward reshaped image (e.g., a predicted SDR image generated by the forward reshaping function, etc.) of a forward reshaping color grade corresponding to (or the same as) the destination color grade, and (2) a backward reshaping function to convert the forward reshaped image of the destination color grade to a reconstructed image (e.g., a predicted or reconstructed HDR image generated by the backward reshaping function, etc.) of the source color grade.

In some operational scenarios, the input SDR and HDR images may be represented/coded in an YCbCr color space with a 444 color sampling format. Each pixel in each of the input images may comprise component pixel values in 3 (color space) channels/components (Y/Cb/Cr) of the YCbCr color space.

Component pixel values of each pixel in each of the input images may be concatenated into a vector.

For example, component pixel values (in Y/Cb/Cr channels or components) of a (e.g., each, etc.) pixel in the input image of the source color grade (or a source domain corresponding to the source color grade) may be concatenated into a single (input source) vector. The vector may then be used as input to one or more forward neural networks used to forward reshape the input image of the source color grade to the forward reshaped image of the destination color grade. More specifically, the forward neural networks use the vector as input to predict component pixel values of a corresponding pixel in the forward reshaped image.

The forward neural networks comprise three subsets of forward neural networks corresponding to Y/Cb/Cr channels/components, respectively. These subsets of forward neural networks may be used to predict component pixel values of the corresponding pixel in Y/Cb/Cr channels or components. The input source vector (e.g., a YUV vector comprising component input values in the 3 color channels or components, etc.) is fed into each subset of forward neural networks for each color component. These subsets of forward neural networks output component predicted values in the corresponding pixel in the forward reshaped image of the destination color grade (or the destination domain).

As illustrated in FIG. 2A, a first subset (denoted as "ForwardNet Y") in the three subsets of forward neural networks may be used to obtain a predicted Y pixel value (denoted as "Pred Dst Y") for the corresponding pixel in the forward reshaped image. A second subset (denoted as "ForwardNet Cb") in the three subsets of forward neural networks may be used to obtain a predicted Cb pixel value (denoted as "Pred Dst Cb") for the corresponding pixel in the forward reshaped image. A third subset (denoted as "ForwardNet Cr") in the three subsets of forward neural networks may be used to obtain a predicted Cr pixel value (denoted as "Pred Dst Cr") for the corresponding pixel in the forward reshaped image.

The predicted component pixel values of the corresponding pixel in the forward reshaped image, as generated by the forward neural networks, may be concatenated into a (predicted destination) vector. The predicted destination vector may be used to drive backward neural networks in the backward path as well as to serve as a basis to compute a forward reshaping cost portion in an overall cost function for the end-to-end system comprising both the forward and backward paths. The overall cost function may be used to obtain operational parameters (e.g., neural network coefficients, etc.) for forward and backward neural networks in the end-to-end system.

In the backward path, the predicted destination vector may be used as input to one or more backward neural networks used to backward reshape the forward reshaped image of the destination color grade to a reconstructed (or backward reshaped) image of the source color grade.

More specifically, the backward neural networks use the vector—comprising the predicted component pixel values as generated by the forward neural networks—as input to predict component pixel values of a corresponding pixel in the reconstructed (or backward reshaped) image of the source color grade (or the source domain).

The backward neural networks comprise three subsets of backward neural networks corresponding to Y/Cb/Cr channels or components, respectively. The predicted destination vector (e.g., a YUV vector comprising component predicted values in the 3 color channels or components, etc.) is fed into each subset of backward neural networks for each color component. These subsets of backward neural networks output component predicted (source) values in the corresponding pixel in the reconstructed (or backward reshaped) image of the source color grade (or the source domain).

As illustrated, a first subset (denoted as "BackwardNet Y") in the three subsets of backward neural networks may be used to obtain a predicted Y pixel value (denoted as "Pred Src Y") for the corresponding pixel in the backward reshaped image. A second subset (denoted as "BackwardNet Cb") in the three subsets of backward neural networks may be used to obtain a predicted Cb pixel value (denoted as "Pred Src Cb") for the corresponding pixel in the backward reshaped image. A third subset (denoted as "BackwardNet Cr") in the three subsets of backward neural networks may be used to obtain a predicted Cr pixel value (denoted as "Pred Src Cr") for the corresponding pixel in the backward reshaped image.

The predicted component pixel values of the corresponding pixel in the backward reshaped image, as generated by the backward neural networks, may be concatenated into a (predicted source) vector. The predicted source vector may be used to serve as a basis to compute a backward reshaping cost portion in the overall cost function for the end-to-end system comprising both the forward and backward paths.

The forward reshaping cost portion in the overall cost function may be computed based at least in part on a difference (e.g., computed with a subtraction operation, computed with a division operation, etc.) between original destination data in the input destination image and predicted destination data in the forward reshaped images. The backward reshaping cost portion in the overall cost function may be computed based at least in part on a difference (e.g., computed with a subtraction operation, computed with a division operation, etc.) between original source data in the input source image and predicted source data in the backward reshaped image. The overall cost function (denoted as "cost") may be formed as a weighted combination of the forward reshaping cost portion and the backward reshaping cost portion by weighting factors (denoted as "weighting factor"). The weighting factors may comprise a source color grade weighing factor (corresponding or assigned to the source color grade) and a destination color grade weighting factor (corresponding or assigned to the destination color grade). Example weighting factors assigned to a given color grade as described herein may include, but are not necessarily limited to, any of: a range such as (0, 1), [0.2, 0.8], [0.3, 0.4], [0.4, 0.6], etc. These weighting factors may or may not be normalized in various embodiments.

This cost function may be used in back propagation to compute or generate the operational parameters for (e.g., each neural network in, etc.) both the forward neural networks and the backward neural networks.

Forward Path Neural Networks

Let triplets $(v_{ji}^y, v_{ji}^{c0}, v_{ji}^{c1})$ and $(s_{ji}^y, s_{ji}^{c0}, s_{ji}^{c1})$ denote normalized Y, $C_0$ (or Cb) and $C_1$ (or Cr) component pixel values for the i-th pixel in the j-th source and destination (or target) images, respectively. Normalized Y, $C_0$ and $C_1$ component pixel values of all P pixels of the source image (frame) may be collected to form three input source vectors respectively for the three color space channels/components Y, $C_0$ and $C_1$, as follows:

$$v_j^y = \begin{bmatrix} v_{j,0}^y \\ v_{j,1}^y \\ \vdots \\ v_{j,P-1}^y \end{bmatrix}, v_j^{c0} = \begin{bmatrix} v_{j,0}^{c0} \\ v_{j,1}^{c0} \\ \vdots \\ v_{j,P-1}^{c0} \end{bmatrix}, \text{ and } v_j^{c1} = \begin{bmatrix} v_{j,0}^{c1} \\ v_{j,1}^{c1} \\ \vdots \\ v_{j,P-1}^{c1} \end{bmatrix} \quad (1)$$

Similarly, normalized Y, $C_0$ and $C_1$ component pixel values of all P pixels of the destination image (frame) may be collected to form three input destination vectors respectively for the three color space channels/components Y, $C_0$ and $C_1$, as follows:

$$s_j^y = \begin{bmatrix} s_{j,0}^y \\ s_{j,1}^y \\ \vdots \\ s_{j,P-1}^y \end{bmatrix}, s_j^{c0} = \begin{bmatrix} s_{j,0}^{c0} \\ s_{j,1}^{c0} \\ \vdots \\ s_{j,P-1}^{c0} \end{bmatrix}, \text{ and } s_j^{c1} = \begin{bmatrix} s_{j,0}^{c1} \\ s_{j,1}^{c1} \\ \vdots \\ s_{j,P-1}^{c1} \end{bmatrix} \quad (2)$$

The input source vectors and the input destination vectors in expressions (1) and (2) may be concatenated or merged into two P×3 matrixes, respectively, as follows:

$$V_j = [v_j^y v_j^{c0} v_j^{c1}] \quad (3)$$

$$S_j = [s_j^y s_j^{c0} s_j^{c1}] \quad (4)$$

Three color components of each pixel in the source image or the destination image may be read out in a merged or concatenated form from a respective row in a corresponding merged matrix of the P×3 matrixes, as follows:

$$v_{j,i} = [v_{j,i}^y v_{j,i}^{c0} v_{j,i}^{c1}] \quad (5)$$

$$s_{j,i} = [s_{j,i}^y s_{j,i}^{c0} s_{j,i}^{c1}] \quad (6)$$

The color components of each pixel in the source image may be used as input to one or more cross-color (or cross-channel) forward neural networks in a forward path as described herein. As used herein, "cross-color" or "cross-channel" refers to a mapping operation that maps multiple components (e.g., two or more of Y, $C_0$ and $C_1$, components in expression (5) above, etc.) to a single component (e.g., a specific one of Y, $C_0$ and $C_1$, etc.).

For the purpose of illustration only, the one or more forward neural networks are implemented as a multi-layer neural network in the forward path. The multi-layer neural network comprises three component multi-layer neural networks for Y, $C_0$, and $C_1$ channels or components, respectively. The first component multi-layer neural network (e.g., "ForwardNet Y" in FIG. 2A, etc.) generates a forward reshaped Y component pixel value. The second component multi-layer neural network (e.g., "ForwardNet Cb" in FIG. 2A, etc.) generates a forward reshaped $C_0$ or Cb component pixel value. The third component multi-layer neural network (e.g., "ForwardNet Cr" in FIG. 2A, etc.) generates a forward reshaped $C_1$ or Cr component pixel value.

The l-th layer of the multi-layer neural network in the forward path may be defined or specified for Y, $C_0$, and $C_1$, as follows:

$$x_{j,i}^{y,(l)} = \Phi_F^{y,(l)}(x_{j,i}^{y,(l-1)}) = f_F^{y,(l)}(W_F^{y,(l)} x_{j,i}^{y,(l-1)} + b_F^{y,(l)}) \quad (7\text{-}1)$$

$$x_{j,i}^{c0,(l)} = \Phi_F^{c0,(l)}(x_{j,i}^{c0,(l-1)}) = f_F^{c0,(l)}(W_F^{c0,(l)} x_{j,i}^{c0,(l-1)} + b_F^{c0,(l)}) \quad (7\text{-}2)$$

$$x_{j,i}^{c1,(l)} = \Phi_F^{c1,(l)}(x_{j,i}^{c1,(l-1)}) = f_F^{c1,(l)}(W_F^{c1,(l)} x_{j,i}^{c1,(l-1)} + b_F^{c1,(l)}) \quad (7\text{-}3)$$

where $W_F^{y,(l)}$, $W_F^{c0,(l)}$, $W_F^{c1,(l)}$ denote forward neural network weighting matrices for Y, $C_0$, and $C_1$ channels or components, respectively; $b_F^{y,(l)}$, $b_F^{c0,(l)}$, $b_F^{c1,(l)}$ denote forward neural network bias vectors for Y, $C_0$, and $C_1$ channels or components, respectively; $f_F^{y,(l)}$, $f_F^{c0,(l)}$, $f_F^{c1,(l)}$ denote forward neural network activation functions for Y, $C_0$, and $C_1$ channels or components, respectively; $x_{j,i}^{y,(l-1)}$, $x_{j,i}^{c0,(l-1)}$, $x_{j,i}^{c1,(l-1)}$ represent inputs to the current l-th layer (from the preceding (l−1)-th layer's output) for Y, $C_0$, and $C_1$ channels or components, respectively; $x_{j,i}^{y,(l)}$, $x_{j,i}^{c0,(l)}$, $x_{j,i}^{c1,(l)}$ represent the current l-th layer's output for Y, $C_0$, and $C_1$ channels or components, respectively. For the first layer of the multi-layer neural network in the forward path, all three component multi-layer neural networks of the multi-layer neural network in the forward path receive common input as $v_{j,i}$ in expression (5) above. Example activation functions may include, are not necessarily limited to only, any of: sigmoid functions, monotonic decreasing or increasing non-linear functions with well-defined derivatives, piece-wise linear segments, step functions, etc.

Denote the total number of (input, hidden and output) layers of the multi-layer neural network in the forward path as ($L_F$+1). Forward reshaped or predicted component pixel values in a forward reshaped color grade corresponding to (or the same as) the destination color grade (or the destination domain), as outputted from the respective component multi-layer neural networks in the forward path, can be given as follows:

$$\hat{s}_{j,i}^{y} = \Phi_F^{y}(v_{j,i}) = \Phi_F^{y,(L_F)}(\ldots \Phi_F^{y,(1)}(\Phi_F^{y,(0)}(v_{j,i}))) \quad (8\text{-}1)$$

$$\hat{s}_{j,i}^{c0} = \Phi_F^{c0}(v_{j,i}) = \Phi_F^{c0,(L_F)}(\ldots \Phi_F^{c0,(1)}(\Phi_F^{c0,(0)}(v_{j,i}))) \quad (8\text{-}2)$$

$$\hat{s}_{j,i}^{c1} = \Phi_F^{c1}(v_{j,i}) = \Phi_F^{c1,(L_F)}(\ldots \Phi_F^{c1,(1)}(\Phi_F^{c1,(0)}(v_{j,i}))) \quad (8\text{-}3)$$

where $\Phi_F^{y}$, $\Phi_F^{c0}$, $\Phi_F^{c1}$ denote end-to-end functions with design (or operational) parameters $\{W_F^{y,(l)}, W_F^{c0,(l)}, W_F^{c1,(l)}\}$ and $\{b_F^{y,(l)}, b_F^{c0,(l)}, b_F^{c1,(l)}\}$ for l=0, ... $L_F$ representing layer-specific neural network weighting matrixes and bias vectors for the component multi-layer neural networks in the forward path.

The forward reshaped or predicted component pixel values, as outputted from the respective component multi-layer neural networks in the forward path, can be represented in a concatenated or merged form for each pixel, as follows:

$$\hat{s}_{j,i} = [\hat{s}_{j,i}^{y} \hat{s}_{j,i}^{c0} \hat{s}_{j,i}^{c1}] \quad (9)$$

The color components of each pixel in the forward reshaped image, as outputted from the respective component multi-layer neural networks in the forward path, may be used as input to one or more cross-color (or cross-channel) backward neural networks in a backward path as described herein, as well as may be used as input to an overall loss function for joint forward and backward optimization in an end-to-end system that comprises both the forward and backward paths.

Forward reshaped or predicted Y, $C_0$ and $C_1$ component pixel values of all P pixels of the forward reshaped image (frame) may be collected to form three predicted destination vectors respectively for the three color space channels/components Y, $C_0$ and $C_1$, as follows:

$$\hat{s}_j^{y} = \begin{bmatrix} \hat{s}_{j,0}^{y} \\ \hat{s}_{j,1}^{y} \\ \vdots \\ \hat{s}_{j,P-1}^{y} \end{bmatrix}, \hat{s}_j^{c0} = \begin{bmatrix} \hat{s}_{j,0}^{c0} \\ \hat{s}_{j,1}^{c0} \\ \vdots \\ \hat{s}_{j,P-1}^{c0} \end{bmatrix}, \text{ and } \hat{s}_j^{c1} = \begin{bmatrix} \hat{s}_{j,0}^{c1} \\ \hat{s}_{j,1}^{c1} \\ \vdots \\ \hat{s}_{j,P-1}^{c1} \end{bmatrix} \quad (10)$$

Backward Path Neural Networks

For the purpose of illustration only, the one or more backward neural networks are implemented as a multi-layer neural network in the backward path. The multi-layer neural network comprises three component multi-layer neural networks for Y, $C_0$, and $C_1$ channels or components, respectively. The first component multi-layer neural network (e.g., "BackwardNet Y" in FIG. 2A, etc.) generates a reconstructed or backward reshaped Y component pixel value.

The second component multi-layer neural network (e.g., "BackwardNet Cb" in FIG. 2A, etc.) generates a reconstructed or backward reshaped $C_0$ or Cb component pixel value. The third component multi-layer neural network (e.g., "BackwardNet Cr" in FIG. 2A, etc.) generates a reconstructed or backward reshaped $C_1$ or Cr component pixel value.

The l-th layer of the multi-layer neural network in the backward path may be defined or specified for Y, $C_0$, and $C_1$, as follows:

$$x_{j,i}^{y,(l)} = \Phi_B^{y,(l)}(x_{j,i}^{y,(l-1)}) = f_B^{y,(l)}(W_B^{y,(l)} x_{j,i}^{y,(l-1)} + b_B^{y,(l)}) \quad (11\text{-}1)$$

$$x_{j,i}^{c0,(l)} = \Phi_B^{c0,(l)}(x_{j,i}^{c0,(l-1)}) = f_B^{c0,(l)}(W_B^{c0,(l)} x_{j,i}^{c0,(l-1)} + b_B^{c0,(l)}) \quad (11\text{-}2)$$

$$x_{j,i}^{c1,(l)} = \Phi_B^{c1,(l)}(x_{j,i}^{c1,(l-1)}) = f_B^{c1,(l)}(W_B^{c1,(l)} x_{j,i}^{c1,(l-1)} + b_B^{c1,(l)}) \quad (11\text{-}3)$$

where $W_B^{y,(l)}$, $W_B^{c0,(l)}$, $W_B^{c1,(l)}$ denote backward neural network weighting matrices for Y, $C_0$, and $C_1$ channels or components, respectively; $b_B^{y,(l)}$, $b_B^{c0,(l)}$, $b_B^{c1,(l)}$ denote backward neural network bias vectors for Y, $C_0$, and $C_1$ channels or components, respectively; $f_B^{y,(l)}$, $f_B^{c0,(l)}$, $f_B^{c1,(l)}$ denote backward neural network activation functions for Y, $C_0$, and $C_1$ channels or components, respectively, $x_{j,i}^{y,(l-1)}$, $x_{j,i}^{c0,(l-1)}$, $x_{j,i}^{c1,(l-1)}$ represent inputs to the current l-th layer (from the preceding (l−1)-th layer's output) for Y, $C_0$, and $C_1$ channels or components, respectively; $x_{j,i}^{y,(l)}$, $x_{j,i}^{c0,(l)}$, $x_{j,i}^{c1,(l)}$ represent the current l-th layer's output for Y, $C_0$, and $C_1$ channels or components, respectively. For the first layer of the multi-layer neural network in the backward path, all three component multi-layer neural networks of the multi-layer neural network in the backward path receive common input as $\hat{s}_{j,i}$ in expression (9) above.

Denote the total number of (input, hidden and output) layers of the multi-layer neural network in the backward path as $(L_B+1)$. Reconstructed or backward reshaped component pixel values in a backward reshaped color grade corresponding to (or the same as) the source color grade (or the source domain), as outputted from the respective component multi-layer neural networks in the backward path, can be given as follows:

$$\hat{v}_{j,i}^y = \Phi_B^y(\hat{s}_{j,i}) = \Phi_B^{y,(L_B)}(\ldots \Phi_B^{y,(1)}(\Phi_B^{y,(0)}(\hat{s}_{j,i}))) \quad (12\text{-}1)$$

$$\hat{v}_{j,i}^{c0} = \Phi_B^{c0}(\hat{s}_{j,i}) = \Phi_B^{c0,(L_B)}(\ldots \Phi_B^{c0,(1)}(\Phi_B^{c0,(0)}(\hat{s}_{j,i}))) \quad (12\text{-}2)$$

$$\hat{v}_{j,i}^{c1} = \Phi_B^{c1}(\hat{s}_{j,i}) = \Phi_B^{c1,(L)}(\ldots \Phi_B^{c1,(1)}(\Phi_B^{c1,(0)}(\hat{s}_{j,i}))) \quad (12\text{-}3)$$

where $\Phi_B^y$, $\Phi_B^{c0}$, $\Phi_B^{c1}$ denote end-to-end functions with design (or operational) parameters $\{W_B^{y,(l)}, W_B^{c0,(l)}, W_B^{c1,(l)}\}$ and $\{b_B^{y,(l)}, b_B^{c0,(l)}, b_B^{c1,(l)}\}$ for l=0, … $L_B$, representing layer-specific neural network weighting matrixes and bias vectors for the component multi-layer neural networks in the backward path.

The backward reshaped or reconstructed component pixel values, as outputted from the respective component multi-layer neural networks in the backward path, can be represented in a concatenated or merged form for each pixel, as follows:

$$\hat{v}_{j,i} = [\hat{v}_{j,i}^y \hat{v}_{j,i}^{c0} \hat{v}_{j,i}^{c1}] \quad (13)$$

The color components of each pixel in the backward reshaped or reconstructed image, as outputted from the respective component multi-layer neural networks in the backward path, may be used as input to the overall loss function for joint forward and backward optimization in the end-to-end system that comprises both the forward and backward paths.

Backward reshaped or reconstructed Y, $C_0$ and $C_1$ component pixel values of all P pixels of the backward reshaped or reconstructed image (frame) may be collected to form three predicted destination vectors respectively for the three color space channels/components Y, $C_0$ and $C_1$, as follows:

$$\hat{v}_j^y = \begin{bmatrix} \hat{v}_{j,0}^y \\ \hat{v}_{j,1}^y \\ \vdots \\ \hat{v}_{j,P-1}^y \end{bmatrix}, \hat{v}_j^{c0} = \begin{bmatrix} \hat{v}_{j,0}^{c0} \\ \hat{v}_{j,1}^{c0} \\ \vdots \\ \hat{v}_{j,P-1}^{c0} \end{bmatrix}, \text{ and } \hat{v}_j^{c1} = \begin{bmatrix} \hat{v}_{j,0}^{c1} \\ \hat{v}_{j,1}^{c1} \\ \vdots \\ \hat{v}_{j,P-1}^{c1} \end{bmatrix} \quad (14)$$

End-to-End Problem Formulation

An end-to-end optimization problem for the end-to-end system or pipeline comprising forward and backward paths as described can be formulated as follows:

$$\hat{v}_{j,i} = \Phi(v_{j,i}) = [\Phi_B^y(\hat{s}_{j,i}) \; \Phi_B^{c0}(\hat{s}_{j,i}) \; \Phi_B^{c1}(\hat{s}_{j,i})] = \left[\Phi_B^y\left(\begin{bmatrix}\Phi_F^y(v_{j,i})\\\Phi_F^{c0}(v_{j,i})\\\Phi_F^{c1}(v_{j,i})\end{bmatrix}^T\right) \; \Phi_B^{c0}\left(\begin{bmatrix}\Phi_F^y(v_{j,i})\\\Phi_F^{c0}(v_{j,i})\\\Phi_F^{c1}(v_{j,i})\end{bmatrix}^T\right) \; \Phi_B^{c1}\left(\begin{bmatrix}\Phi_F^y(v_{j,i})\\\Phi_F^{c0}(v_{j,i})\\\Phi_F^{c1}(v_{j,i})\end{bmatrix}^T\right)\right] \quad (15)$$

The overall cost function for the joint forward and backward path optimization can be formulated as a weighted combination of forward path loss portions and backward loss portions representing distortions in each of the color channels/components Y, $C_0$ and $C_1$ in each of the forward and backward paths, as follows:

$$E = w_F^y \cdot \|\hat{s}_j^y - s_j^y\|^2 + w_F^{c0} \cdot \|\hat{s}_j^{c0} - s_j^{c0}\|^2 + w_F^{c1} \cdot \|\hat{s}_j^{c1} - s_j^{c1}\|^2 + w_B^y \cdot \|\hat{v}_j^y - v_j^y\|^2 + w_B^{c0} \cdot \|\hat{v}_j^{c0} - v_j^{c0}\|^2 + w_B^{c1} \cdot \|\hat{e}_j^{c1} - v_j^{c1}\|^2 \quad (16)$$

where $w_F^y$, $w_F^{c0}$, $w_F^{c1}$ denote forward path (loss function) weighting factors for Y, $C_0$ and $C_1$, respectively; $w_B^y$, $w_B^{c0}$, $w_B^{c1}$ denote backward path (loss function) weighting factors for Y, $C_0$ and $C_1$, respectively. These loss function weighting factors represent design variables used to control a desired tradeoff or a desired preference between the source and destination color grades. More specifically, the higher the forward path (loss function) weighting factors are in comparison with the backward path (loss function) weighting factors, the better look the destination (or forward reshaped) color grade achieves, the worse look the source (or backward reshaped) color grade achieves. Conversely, the less the forward path (loss function) weighting factors are in comparison with the backward path (loss function) weighting factors, the worse look the destination (or forward reshaped) color grade achieves, the better look the source (or backward reshaped) color grade achieves. In some operational scenarios, all forward and backward (loss function) weighting factors as assigned to all differences or distortions in a loss function (e.g., expression (16) above, etc.) as described herein computed between all reshaped images and all input (source and/or destination) images are normalized to one (1).

The loss function as specified in expression (16) above can be used (e.g., minimized, etc.) to derive the operational parameters for the forward and backward neural networks, as follows:

$$\{W_F^{y,(l)}, W_F^{c0,(l)}, W_F^{c1,(l)}\} \text{ and } \{b_F^{y,(l)}, b_F^{c0,(l)}, b_F^{c1,(l)}\}$$
$$\text{for } l=0, \ldots L_F \quad (17\text{-}1)$$

$$\{W_B^{y,(l)}, W_B^{c0,(l)}, W_B^{c1,(l)}\} \text{ and } \{b_B^{y,(l)}, b_B^{c0,(l)}, b_B^{c1,(l)}\}$$
$$\text{for } l=0, \ldots L_B \quad (17\text{-}2)$$

These operational parameters or neural network coefficients may be solved using back-propagation based on minimizing the loss function in expression (16) above. The optimization problem as formulated above may be solved iteratively via (e.g., standard, proprietary, enhanced, commercially available, specifically developed, etc.) neural network optimization solvers.

In some operational scenarios, forward reshaped images generated from the forward path may be coded in a coded bitstream along with image metadata specifying operational parameters for the backward path such as indicated in expression (17-2) above. Additionally, optionally or alternatively, operations as described herein may be performed in a training phase and an encoding phase. For example, the forward reshaped images may be generated in the training phase. Encoding of some or all of the forward reshaped images may be encoded in the encoding phase.

For the purpose of illustration only, it has been described that input vectors comprising individual pixel values may be used at least in part to drive forward and backward neural networks and joint forward and backward path optimization as described herein. It should be noted that, in various embodiments, other ways of driving forward and backward neural networks and joint forward and backward path optimization may be implemented or performed. For example, in addition to or in place of the pixel-based problem formulation as described above in which the input vector comprises individual pixel values, an input vector comprising aggregated pixel values such as aggregated values derived based on three-dimensional mapping table (3DMT) or three dimensional (3D) color cubes may be used at least in part to drive forward and backward neural networks and joint forward and backward path optimization as described herein. Example 3DMT descriptions are described in PCT Application PCT/US2019/031620, filed on May 9, 2019, "High-fidelity full reference and high-efficiency reduced reference encoding in end-to-end single layer backward-compatible encoding pipeline," by Q. Song et al., published as WO 2019/217751, the entire contents of which are hereby incorporated by reference as if fully set forth herein.

Joint Optimization for Single-Layer Progressive Codecs

Joint forward and backward path optimization can be extended to support more color grades than a source color grade and a destination color grade that depict the same scenes or visual semantic contents.

Figure 2B:
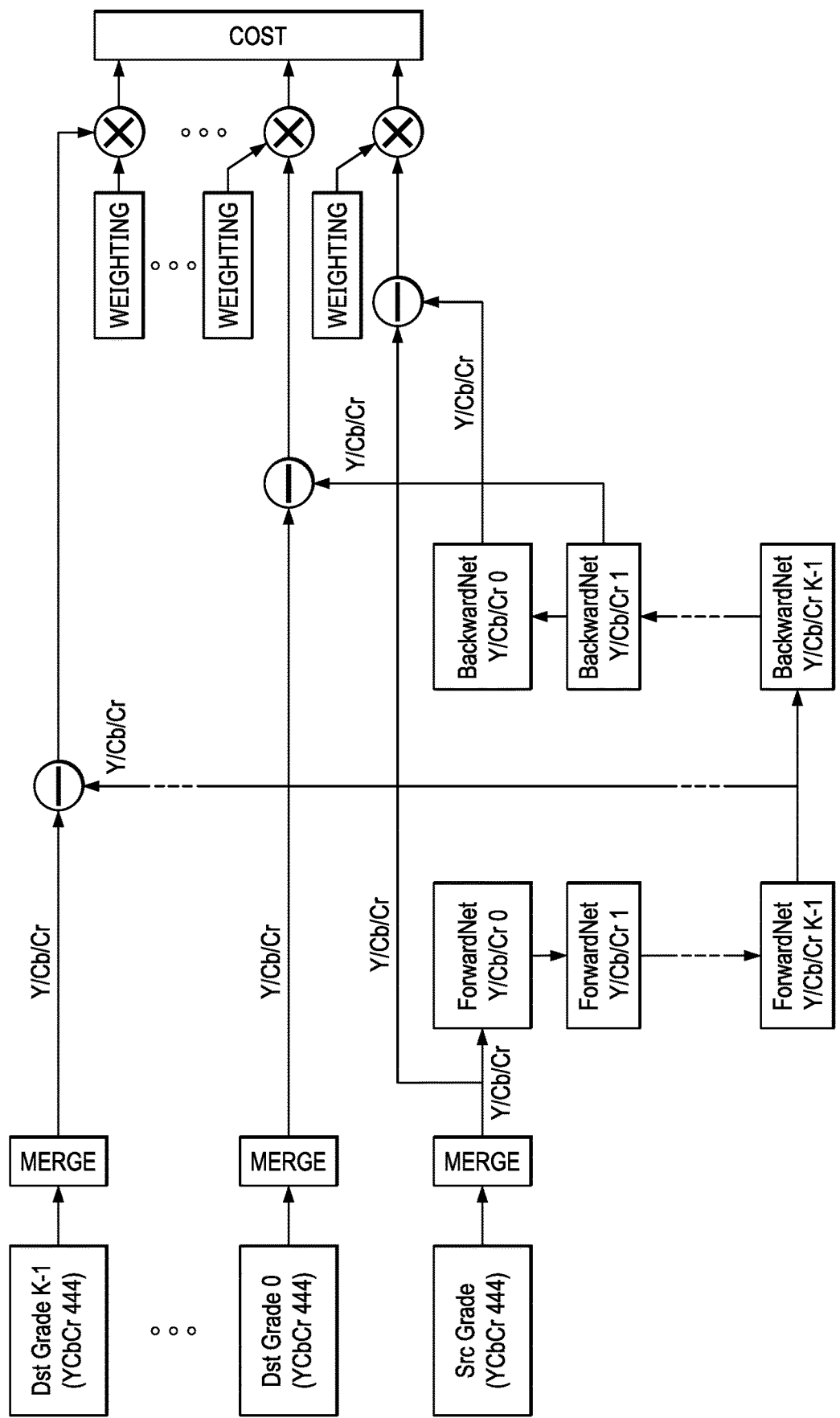
FIG. 2B illustrates an example joint forward and backward optimization framework for progressive SLBC coding or single-layer progressive coding (SLPC)

FIG. 2B illustrates an example joint forward and backward optimization framework for progressive SLBC coding or single-layer progressive coding (SLPC). The framework may, but is not limited to, be implemented with a progressive SLBC codec in one or more of: a video encoder, a video transcoder, a video streaming server, and so forth. As shown, input as received by the progressive SLBC codec (e.g., the coding block (120) of FIG. 1, etc.) may comprise two different types of input images belonging to a source color grade (denoted as "Src Grade (YCbCr 444)") and a plurality of destination color grades denoted as "Dst Grade 0 (YCbCr 444)" through "Dst Grade K−1 (YCbCr 444)," respectively; where K represents the total number of destination color grades in the plurality of destination color grades.

For the purpose of illustration only, the input images to the progressive SLBC codec may comprise a source image as an input image of the source color grade (e.g., an HDR color grade, etc.) and a plurality of target images as input images of the destination color grades. All the source and target images depict the same scene (or the same visual semantic content) but at different quality levels such as different dynamic ranges.

The joint optimization framework is implemented by the progressive SLBC codec to find (1) a plurality of forward reshaping functions to convert the source image of the source color grade to a plurality of forward reshaped images in a plurality of forward reshaping color grades corresponding to (or the same as) the plurality of destination color grades, and (2) a plurality of backward reshaping functions to convert a forward reshaped image of a selected destination color grade (e.g., the last destination color grade, destination color grade K−1, etc.) in the plurality of forward reshaped image of the plurality of destination color grades to a reconstructed image of the source color grade and other reconstructed images of other destination color grades (e.g., other than the selected destination color grade, destination color grades 0 through (K−2), etc.) in the plurality of destination color grades.

In some operational scenarios, the source and target images may be coded or represented in an YCbCr color space with a 444 color sampling format. Each pixel in each of the source and target images may comprise component pixel values in 3 (color space) channels/components (Y/Cb/Cr) of the YCbCr color space.

Component pixel values of each pixel in each of the source and target images may be concatenated into a vector.

For example, component pixel values (in Y/Cb/Cr channels or components) of a (e.g., each, etc.) pixel in the source image of the source color grade (or a source domain corresponding to the source color grade) may be concatenated into a single (input source) vector. The vector may then be used as input to a plurality of sets of one or more forward neural networks used to forward reshape the source image of the source color grade to the plurality of forward reshaped images of the plurality of destination color grades. More specifically, the plurality of sets of forward neural networks use the vector as input to predict component pixel values of a plurality of corresponding pixels in the plurality of forward reshaped images.

Each set in the plurality of sets of forward neural networks comprises three subsets of forward neural networks corresponding to Y/Cb/Cr channels (or components), respectively. These subsets of forward neural networks may be used to predict component pixel values of the corresponding pixel in Y/Cb/Cr channels or components of a corresponding forward reshaped image in the plurality of forward reshaped images.

The first set (denoted as "ForwardNet YCbCr 0") in the plurality of sets of forward neural networks may be used to output the first forward reshaped image (e.g., "Dest Grade 0 (YCbCr 444)" in the plurality of forward reshaped images. The input source vector (e.g., a YUV vector comprising component input values in the 3 color channels or components, etc.) is fed into each subset of forward neural networks for each color component in the first set ("ForwardNet YCbCr 0") in the plurality of sets of forward neural networks. These subsets of forward neural networks in the first set ("ForwardNet YCbCr 0") in the plurality of sets of forward neural networks output component predicted values in the corresponding pixel in the first forward reshaped image of the first destination color grade (or the destination domain).

The second set (denoted as "ForwardNet YCbCr 1") in the plurality of sets of forward neural networks may be used to output the second forward reshaped image (e.g., "Dest Grade 1 (YCbCr 444)" in the plurality of forward reshaped images. The component predicted values in the corresponding pixel in the first forward reshaped image are fed into each subset of forward neural networks for each color component in the second set ("ForwardNet YCbCr 1") in the plurality of sets of forward neural networks. These subsets of forward neural networks in the second set ("ForwardNet YCbCr 1") in the plurality of sets of forward neural networks output component predicted values in the corresponding pixel in the second forward reshaped image of the second destination color grade (or the destination domain).

The foregoing operations may be repeated by other sets in the plurality of sets of forward neural networks to output or predict component pixel values of corresponding pixels in other forward reshaped images in the plurality of forward reshaped images of the plurality of destination color grades, until component pixel values of a corresponding pixel in the last forward reshaped image of the last destination color grade ("Dest Grade K−1 (YCbCr 444)") are outputted or predicted by the last set (denoted as "ForwardNet YCbCr K−1") in the plurality of sets of forward neural networks at the end of the forward path.

Predicted component pixel values of the corresponding pixel in the last forward reshaped image, as generated at the end of the plurality of sets of the forward neural networks in the forward path, may be concatenated into a (last predicted destination) vector. The last predicted destination vector may be used to drive backward neural networks in the backward path as well as to serve as a basis to compute a forward reshaping cost portion in an overall cost function for the end-to-end system comprising both the forward and backward paths. The overall cost function may be used to obtain operational parameters (e.g., neural network coefficients, etc.) for forward and backward neural networks in the end-to-end system.

In the backward path, the last predicted destination vector may be used as input to a plurality of sets of one or more backward neural networks used to backward reshape the last forward reshaped image of the last destination color grade to reconstructed (or backward reshaped) images of destination color grades other than the last destination color grade as well as a reconstructed (or backward reshaped) image of the source color grade.

More specifically, the backward neural networks use the last predicted destination vector—comprising the predicted component pixel values as last generated by the plurality of sets of forward neural networks—as input to predict component pixel values of corresponding pixels in the reconstructed (or backward reshaped) images of destination color grades other than the last destination color grade as well as the reconstructed (or backward reshaped) image of the source color grade.

The first set (denoted as "BackwardNet YCbCr K−1") in the plurality of sets of backward neural networks may be used to output the first reconstructed (or backward reshaped) image of the first backward reshaped color grade (e.g., "Dest Grade K−2 (YCbCr 444)," not shown in FIG. 2B, etc.) in a color grade group that comprises the destination color grades other than the last destination color grade and the source color grade. The last predicted destination vector (e.g., a YUV vector comprising component input values in the 3 color channels or components, etc.) is fed into each subset of backward neural networks for each color component in the first set ("BackwardNet YCbCr K−1") in the plurality of sets of backward neural networks. These subsets of backward neural networks in the first set ("BackwardNet YCbCr K−1") in the plurality of sets of backward neural networks output component predicted values in the corresponding pixel in the first reconstructed (or backward reshaped) image of the first backward reshaped color grade.

The second set in the plurality of sets of backward neural networks may be used to output the second reconstructed (or backward reshaped) image of the second backward reshaped color grade (e.g., not shown in FIG. 2B, etc.) in the color grade group that comprises other destination color grades other than the last destination color grade and the source color grade. The component predicted values in the corresponding pixel in the first reconstructed image of the first backward reshaped color grade are fed into each subset of backward neural networks for each color component in the second set in the plurality of sets of backward neural networks. These subsets of backward neural networks in the second set in the plurality of sets of backward neural networks output component predicted values in the corresponding pixel in the second reconstructed (or backward reshaped) image of the second backward reshaped color grade.

The foregoing operations may be repeated by other sets in the plurality of sets of backward neural networks to output or predict component pixel values of corresponding pixels in other backward reshaped images in the plurality of backward reshaped images for the color grade group that comprises other destination color grades other than the last destination color grade and the source color grade, until component pixel values of a corresponding pixel in the reconstructed image of the source grade ("Src Grade (YCbCr 444)") are outputted or predicted by the last set (denoted as "BackwardNet YCbCr 0") in the plurality of sets of backward neural networks at the end of the backward path.

As shown in FIG. 2B, component pixel values of a corresponding pixel in a reconstructed image of the last destination grade ("Dest Grade 0 (YCbCr 444)") are outputted or predicted by the second last set (denoted as "BackwardNet YCbCr 1") preceding the last set ("BackwardNet YCbCr 0") in the plurality of sets of backward neural networks.

As illustrated in FIG. 2B, the progressive SLBC coding may partition the forward path into multiple sub-nets (e.g., "ForwardNet YCbCr 0" through "ForwardNet YCbCr K−1," etc.) represented by the plurality of sets of forward neural networks, with each of the multiple sub-nets represented by a corresponding set of forward neural networks in the plurality of sets of forward neural networks. In some operational scenarios, each sub-net or a set of forward neural networks may comprise relatively few layers (e.g., one hidden layer, two hidden layers, etc.). These sub-nets may successively forward shape a relatively high quality color grade (e.g., of a dynamic range of 10000 nits or more, etc.) to a sequence of successively lower quality color grades (e.g., from a dynamic range of 10000 nits to 600 nits and even to 100 nits or less, etc.).

Likewise, the progressive SLBC coding may partition the backward path into multiple sub-nets (e.g., "BackwardNet YCbCr K−1" through "BackwardNet YCbCr 0," etc.) represented by the plurality of sets of backward neural networks, with each of the multiple sub-nets represented by a corresponding set of backward neural networks in the plurality of sets of backward neural networks. In some operational scenarios, each sub-net or a set of backward neural networks may comprise relatively few layers (e.g., one hidden layer, two hidden layers, etc.). These sub-nets may successively backward reshape a relatively low color grade (e.g., the lowest color grade, of a dynamic range of 100 nits or less, etc.) to a sequence of successively higher quality color grades (e.g., from a dynamic range of 100 nits or less to 600 nits and even to 10000 nits or more, etc.).

In some operational scenarios, predicted component pixel values of a corresponding pixel in each backward reshaped image in the plurality of backward reshaped images for the plurality of destination color grades, as generated by the plurality of sets of backward neural networks in the backward path, may be concatenated into a (predicted source) vector. Each such predicted source vector for each destination color grade in the plurality of destination color grades may be used to serve as a partial basis to compute a backward reshaping cost portion in the overall cost function for the end-to-end system comprising both the forward and backward paths.

The forward reshaping cost portion in the overall cost function for the progressive SLBC coding may be computed based at least in part on a difference (e.g., computed with a subtraction operation, computed with a division operation, etc.) between original destination data in the (K−1)-th destination image of the last destination color grade ("Dst Grade YCbCr K−1") and the last predicted destination data of the last destination color grade ("Dst Grade YCbCr K−1") generated at the end of the forward path.

The backward reshaping cost portion in the overall cost function for the progressive SLBC coding may be computed based at least in part on differences (e.g., computed with subtraction operations, computed with division operations, etc.) between the reconstructed images of the color grade group (that comprises the source grade and all destination color grades except the last destination color grade) and the input images (or the input source and destination images) of the same color grade group.

The overall cost function (denoted as "cost") for the progressive SLBC coding may be formed as a weighted combination of the forward reshaping cost portion and the backward reshaping cost portion by weighting factors (denoted as "weighting factor"). The weighting factors may comprise a source color grade weighing factor (corresponding or assigned to the source color grade) and a plurality of destination color grade weighting factors (corresponding or assigned to the plurality of destination color grades). Each destination color grade weighting factor in the plurality of destination color grade weighting factors corresponds or is assigned to a respective destination color grade in the plurality of destination color grades.

This cost function for the progressive SLBC coding may be used to in back propagation to compute or generate the operational parameters for (e.g., each neural network, etc.) in both the plurality of sets of forward neural networks and the plurality of sets of backward neural networks. Source images representing input to the neural networks and destination images representing output to the neural networks and the loss function may be provided to a neural network solver such as commercially available Google Tensorflow to obtain operational parameters for the neural networks by back propagation implemented in the neural network solver. Additionally, optionally or alternatively, enhanced neural network solver may be used. In some operational scenarios, back propagation may be implemented in a sequence of multiple stages of neural networks. Different cost portions in the loss function may be used to separately drive back propagation in different stages of the sequence of multiple stages of neural networks.

Progressive Coding Problem Formulation

Let $s_j^{(k)}$ denote a 3-color destination vector of the i-th pixel at the j-th image (frame) of the k-th destination (or reference) color grade in a plurality of destination color grades, where k represents an integer from 0 to (K−1). Some or all the destination color grades may be content-mapped and/or color graded by colorist(s) to serve as desired looks for respective reference display devices of different display capabilities (e.g., in multiple quality levels, in multiple different dynamic ranges, in multiple different color spaces or color gamuts, etc.).

Let $\Phi_F$ denote a forward neural network based mapping function (or a forward path) which performs neural network operations/mappings to convert or transform a 3-color source vector (denoted as $v_{j,i}$) of the i-th pixel at the j-th image (frame) of a source grade into a 3-color predicted destination vector (denoted as $\hat{s}_{j,i}$) of the i-th pixel at the j-th image (frame) of the (K−1)-th destination (or reference) color grade, as follows:

$$\hat{s}_{j,i} = \Phi_F(v_{j,i}) \tag{18}$$

The forward path may be partitioned into K sub-nets, $\Phi_F^{(k)}$, as follows:

$$\hat{s}_{j,i} = \Phi_F(v_{j,i}) = \Phi_F^{(K-1)}(\Phi_F^{(K-2)}(\ldots \Phi_F^{(0)}(v_{j,i}))) \tag{19}$$

A 3-color predicted destination vector outputted from each sub-net in the K sub-nets, $\Phi_F^{(k)}$ may be given as follows:

$$\hat{s}_{j,i}^{(k)} = \Phi_F^{(k)}(\hat{s}_{j,i}^{(k-1)}) \tag{20}$$

For k=0, $\hat{s}_{j,i}^{(k-1)}$ on the right hand side is $v_{j,i}$.
For k=K−1, $\hat{s}_{j,i}^{(k)}$ on the left hand side is $\hat{s}_{j,i}$.

Let $\Phi_B$ denote a backward neural network based mapping function (or a backward path) which performs neural network operations/mappings to convert or transform a 3-color source vector (denoted as $\hat{s}_{j,i}$) of the i-th pixel at the j-th image (frame) of the last destination color grade into a 3-color predicted backward reshaped vector (denoted as $\hat{v}_{j,i}$) of the i-th pixel at the j-th image (frame) of the source color grade. The backward path may be partitioned into K sub-nets $\Phi_B^{(k)}$, as follows:

$$\hat{v}_{j,i} = \Phi_B(\hat{s}_{j,i}) = \Phi_B^{(0)}(\Phi_B^{(1)}(\ldots \Phi_B^{(K-1)}(\hat{s}_{j,i}))) \tag{21}$$

A 3-color predicted backward reshaped vector outputted from each sub-net in the K sub-nets, $\Phi_B^{(k)}$ may be given as follows:

$$\hat{v}_{j,i}^{(k)} = \Phi_B^{(k)}(\hat{v}_{j,i}^{(k+1)}) \tag{22}$$

For k=K−1, $\hat{v}_{j,i}^{(k+1)}$ on the right hand side is $\hat{s}_{j,i}$.
For k=0, $\hat{v}_{j,i}^{(k)}$ on the left hand side is $\hat{v}_{j,i}$.

The overall cost function for the joint forward and backward path optimization for the progressive SLBC can be formulated as a weighted combination of forward path loss portions and backward loss portions representing distortions in each of the color channels/components Y, $C_0$ and $C_1$ in each of the forward and backward paths, as follows:

$$E = w_F \|\hat{s}_j - s_j\|^2 + \sum_{k=0}^{K-1} w_B^{(k)} \|\hat{v}_j^{(k)} - v_j^{(k)}\|^2 \tag{23}$$

where $w_F$ and $\{w_B^{(k)}\}$ are (loss function) weighting factor for each of the source grade and the destination grades. These loss function weighting factors represent design variables used to control a desired tradeoff or a desired preference among the source and destination color grades. More specifically, the higher (loss function) weighting factors of a reconstructed color grade are in comparison with (loss function) weighting factors of other color grades, the better look the reconstructed color grade achieves. In some operational scenarios, all loss function weighting factors as assigned to all differences or distortions in a loss function (e.g., expression (23) above, etc.) as described herein computed between all reshaped images and all input (source and/or destination) images are normalized to one (1). In various embodiments, different grade-level loss function weighting factors may be assigned to different color grades in the loss function. These grade-level loss function weighting factors may be selected to emphasize quality levels of one or more selected color grades among a plurality of available color grades. Additionally, optionally or alternatively, for each color grade, path-level loss function weighting factors may be selected to emphasize the quality level of forward reshaped images of the color grade or the quality level of backward reshaped image of the color grade.

The loss function as specified in expression (23) above can be used (e.g., minimized, etc.) to derive operational parameters for the forward and backward neural networks. These operational parameters include operational parameters, denoted as $\{W_B^{y,(l)}, W_B^{c0,(l)}, W_B^{c1,(l)}\}$ and $\{b_B^{y,(l)}, b_B^{c0,(l)}, b_B^{c1,(l)}\}$ for l=0, . . . $L_B$, for the backward neural networks in the backward path.

These operational parameters or neural network coefficients may be solved using back-propagation based on minimizing the loss function in expression (23) above. The optimization problem as formulated above may be solved iteratively via (e.g., standard, proprietary, enhanced, commercially available, specifically developed, etc.) neural network optimization solvers.

For the purpose of illustration only, it has been described that forward reshaped images last generated at the end of a forward path and backward reshaped images throughout a backward path (e.g., as show in FIG. 2B, etc.) may be used in a loss function as described herein. In operational scenarios in which a recipient device is to generate backward reshaped images, such loss function used by an upstream video encoder may better match what are to be generated by the recipient device. It should be noted that in various embodiments, in addition to or in place of the backward reshaped images throughout the backward path, forward reshaped images generated throughout the forward path may be used in a loss function as described herein. In operational scenarios in which a recipient device is to generate forward reshaped images, such loss function used by an upstream video encoder may better match what are to be generated by the recipient device.

Pure Backward Neural Networks at Decoder

Figure 3A:
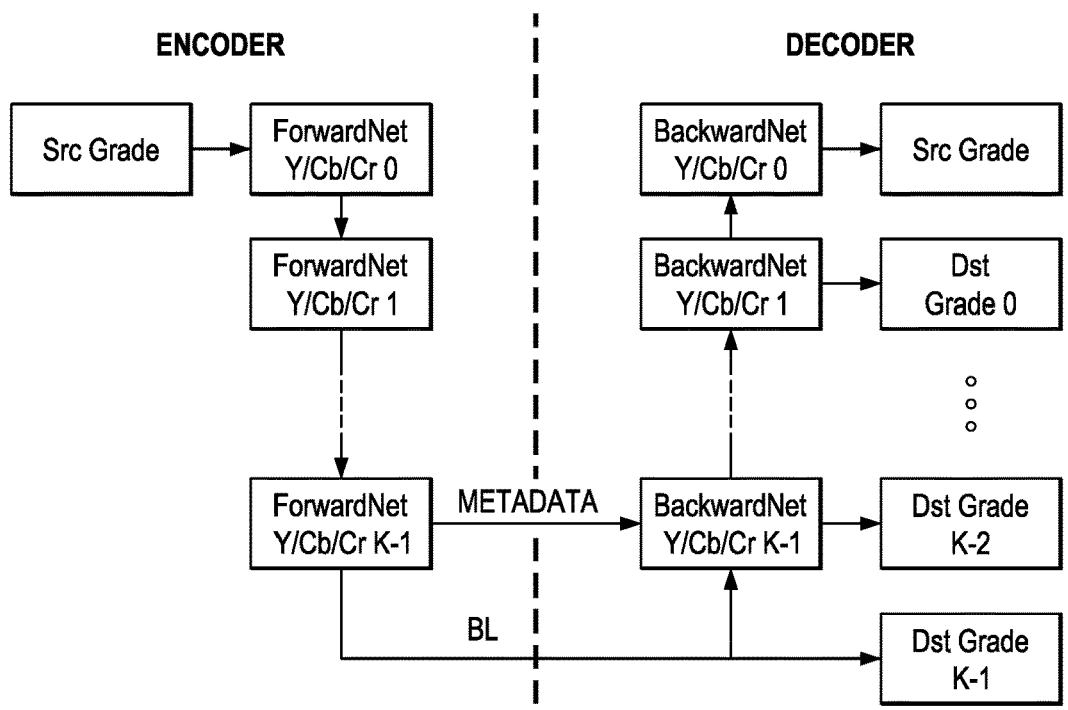
FIG. 3A through FIG. 3E illustrate examples of joint forward and backward path optimization.
Figure 3B:
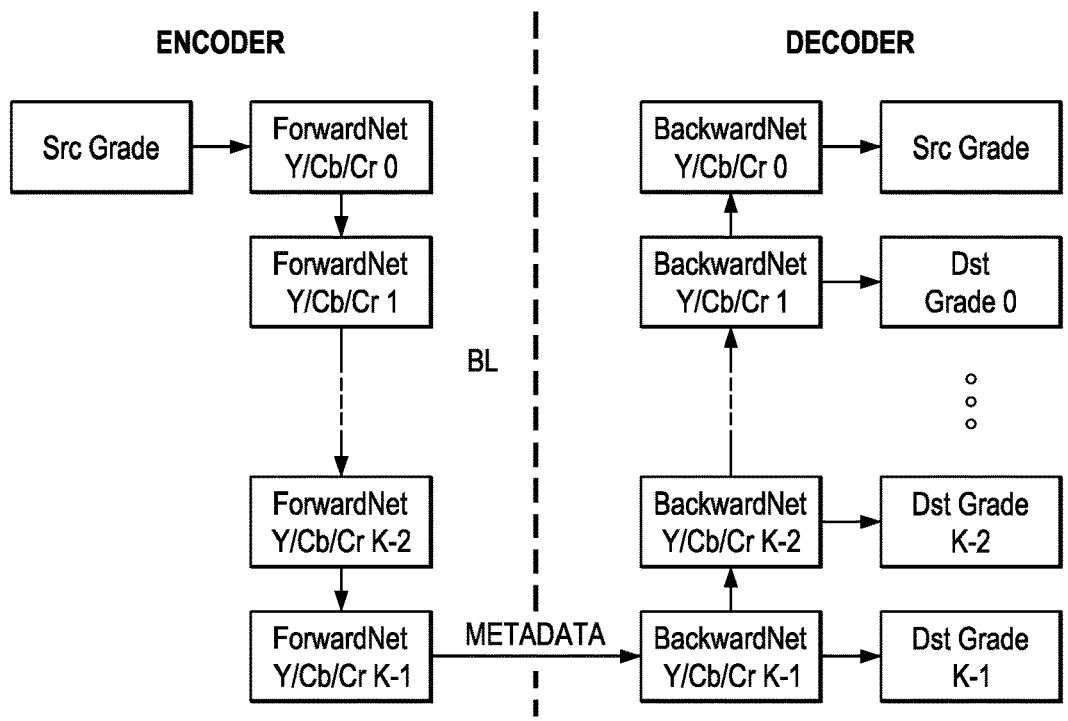

In some operational scenarios, as illustrated in FIG. 3A, a source color grade (denoted as "Src Grade") may be forward reshaped by set(s) (denoted as "ForwardNet Y/Cb/Cr 0" through "ForwardNet Y/Cb/Cr K−1") of one or more forward neural networks by a video encoder as described herein.

Forward reshaped images of the last destination color grade outputted at the end of a forward path are encoded into a coded bitstream (e.g., 122 of FIG. 1, for example, in a base layer (denoted as BL) of a video signal. Some or all operational parameters for some or all backward neural networks (denoted as "BackwardNet Y/Cb/Cr K−1" through "BackwardNet Y/Cb/Cr 0") in a corresponding backward path may be generated (not shown in FIG. 3A; see FIG. 2A or FIG. 2B) by the video encoder and coded as image metadata (denoted as "RPU") into the coded bitstream.

A recipient device of the coded bitstream including but not limited to a video decoder may decode the image metadata and the forward reshaped images of the middle color grade from the coded bitstream and use the operational parameters for the subset of backward neural networks and the subset of the forward neural networks in the image metadata ("RPU") to generate backward or forward reshaped images of other color grades other than the middle color grade, by backward or forward reshaping the forward reshaped images of the middle as decoded from the coded bitstream using some or all the backward or forward neural networks with the operational parameters received in the coded bitstream. These backward or forward reshaped images represent reconstructed images of a color grade other than the middle color grade (which is already coded in the coded bitstream).

More specifically, the video decoder can use the subset of backward neural networks to convert the middle color grade to higher color grades. Likewise, the video decoder can use the subset of forward neural networks to convert the middle color grade to lower color grades. A non-limiting example is that the base layer is encoded with a 1000 nits HDR 10 PQ color grade. The subset of backward neural networks can be used to reconstruct images of up to the source color grade such as a 4000 nit (e.g., Dolby Vision, etc.) color grade, whereas the subset of forward neural networks can be used to forward reshape images of down to an R.709 100 nits color grade.

Figure 3C:
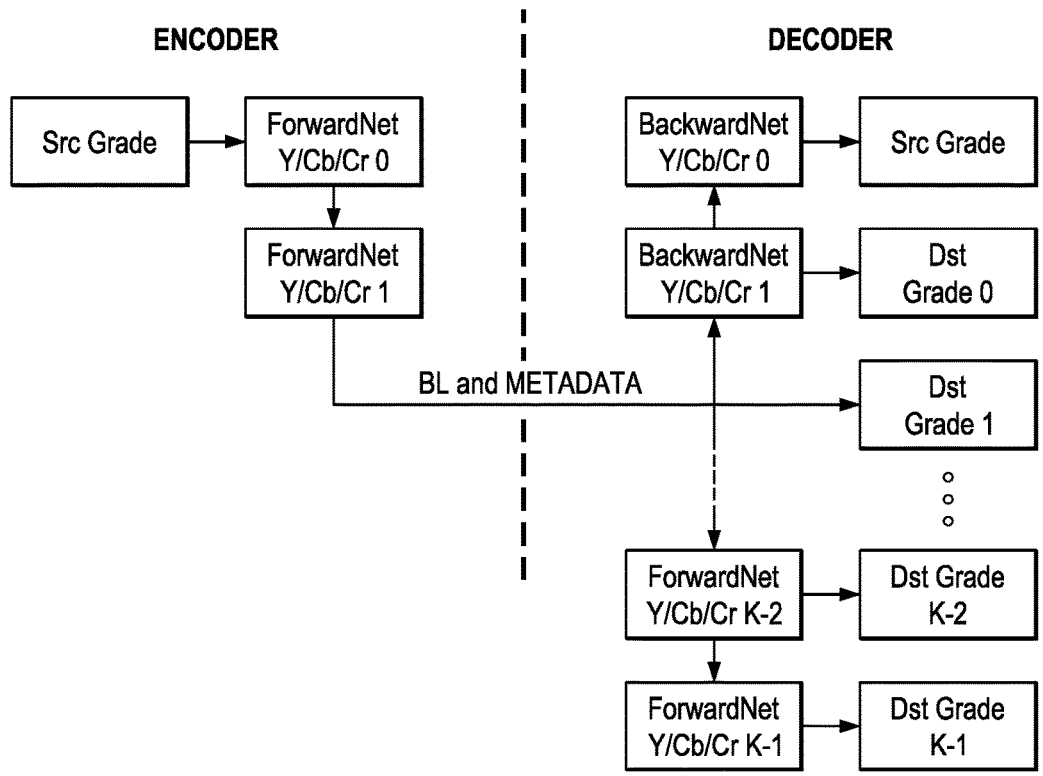

Depending on which color grade is selected to serve as—or to provide image data encoded by the video encoder in—the base layer in the coded bitstream, the image metadata carried by the coded bitstream may be different. By way of illustration but not limitation, as shown in FIG. 3C, a destination color grade denoted as "Dst Grade 1" is selected to serve as—or to provide image data encoded by the video encoder in—the base layer of the coded bitstream. The video encoder may further code the image metadata into the coded bitstream to allow a recipient device of the coded bitstream to use the image metadata to reconstruct images of one or more different color grades other than the destination color grade, without needing to encoding image data of these color grades in the coded bitstream.

As shown in FIG. 3C, the image metadata may comprise a first set of operational parameters (or Backward Net 1 coefficients) for a first set of backward neural networks. The recipient device may apply the first set of backward neural networks with the first set of operational parameters to the image data of the destination color grade "Dst Grade 1," as decoded from the coded bitstream, to generate or predict reconstructed image data (e.g., reconstructed images, etc.) of a destination color grade "Dst Grade 0."

In some operational scenarios, the image metadata may further comprise a second set of operational parameters (or Backward Net 0 coefficients) for a second set of backward neural networks. The recipient device may further apply the second set of backward neural networks with the second set of operational parameters to the reconstructed image data of the destination color grade "Dst Grade 0," as generated or predicted from the first set of backward neural networks, to generate or predict reconstructed image data (e.g., reconstructed images, etc.) of the source grade.

Additionally, optionally or alternatively, the image metadata may comprise one or more sets of operational parameters (e.g., Forward Net 2 coefficients, Forward Net 3 coefficients, . . . Forward Net K−2 coefficients, Forward Net K−1 coefficients, etc.) for one or more sets of forward neural networks. The recipient device may apply some or all of the one or more sets of forward neural networks with some or all of the one or more sets of operational parameters to the image data of the destination color grade "Dst Grade 1," as decoded from the coded bitstream, to generate or predict reconstructed image data (e.g., reconstructed images, etc.) of a destination color grade (e.g., "Dst Grade K−2," "Dst Grade K−1," etc.) other than the destination color grade "Dst Grade 1."

Thus, in hybrid joint optimization, operational parameters for both the forward neural networks and the backward neural networks may be generated by a video encoder and encoded in a coded bitstream as described herein to enable generation or prediction of reconstructed images of color grades other than a color grade for which image data is encoded in the coded bitstream.

In some operational scenarios, neural network coefficients included in image metadata as described herein may refer to weighting factors and biases used in activation functions of neural networks. In some operational scenarios, neural network coefficients included in image metadata as described herein may refer to operational parameters in addition to weighting factors and biases used in activation functions of neural networks. By way of example but not limitation, an upstream video encoder generating the image metadata and a recipient video decoder using the image metadata may employ same specific type(s) of (e.g., pre-configured, pre-fixed, etc.) activation function types. Accordingly, the video encoder may not (e.g., need to, etc.) signal the activation function types. Additionally, optionally or alternatively, an upstream video encoder generating the image metadata and a recipient video decoder using the image metadata may select specific type(s) of activation function types from among multiple available activation function types. Accordingly, the video encoder may include operational parameters in addition to or other than weighting factors and biases used inside activation functions for the purpose of (e.g., dynamically, adaptively, etc.) identifying the selected activation function type(s) and/or other parameters used therein. Coding syntaxes may be specified and implemented by video codecs such as video encoders and video decoders for the purpose of coding and decoding operational parameters to or from the image metadata.

2D Forward and Backward Neural Networks at Decoder

In some operational scenarios, pure or hybrid architecture for joint forward and backward path optimization may be extended to destination color grades represented in a two-dimensional (2D) grid. The 2D grid may comprise destination color grades with a first dimension indicating different color spaces (or different color gamuts) and a second dimension indicating different dynamic ranges with different maximum luminances.

Figure 3D:
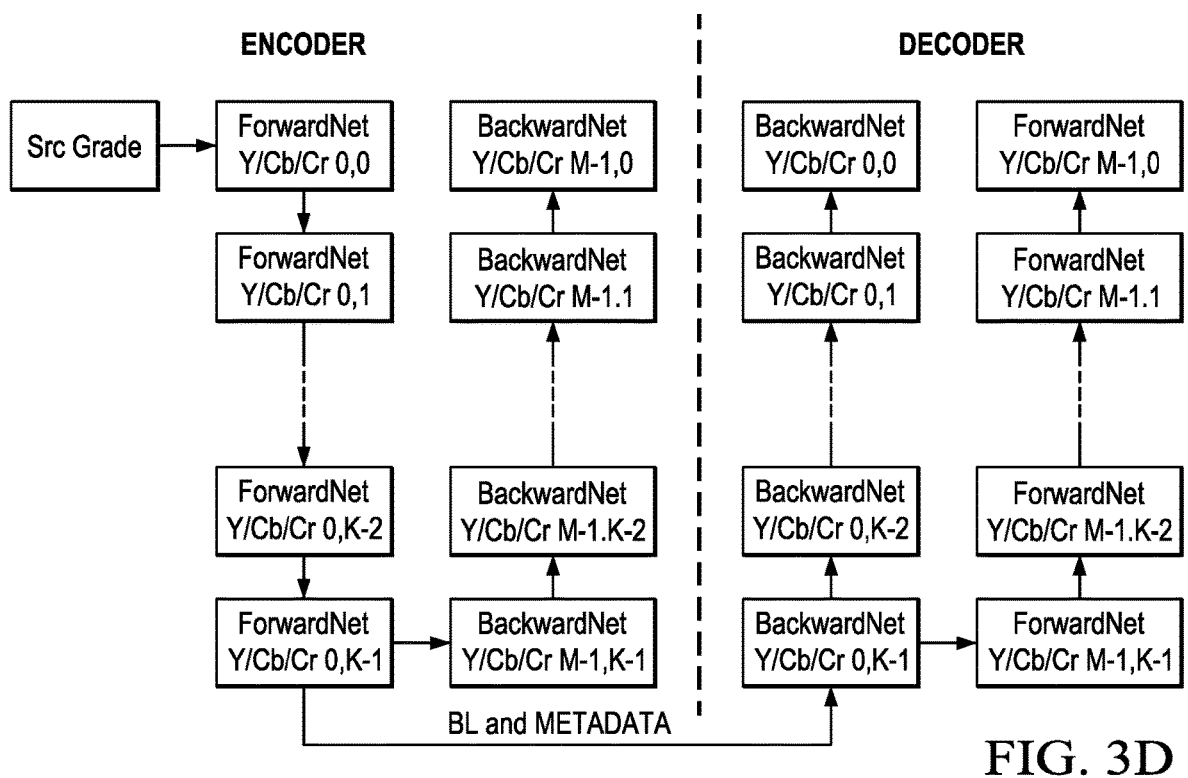

As illustrated in FIG. 3D, a source color grade (denoted as "Src Grade") may serve as input to the forward path on the encoder side. The source color grade may be forward reshaped by 2D sets (denoted as "ForwardNet Y/Cb/Cr 0, 0," "ForwardNet Y/Cb/Cr 0, 1,". . . "ForwardNet Y/Cb/Cr 0, K−2," "ForwardNet Y/Cb/Cr 0, K−1,". . . "ForwardNet Y/Cb/Cr M−1, 0," "ForwardNet Y/Cb/Cr M−1, 1,". . . "ForwardNet Y/Cb/Cr M−1, K−2," "ForwardNet Y/Cb/Cr M−1, K−1,") of one or more forward neural networks by a video encoder as described herein to generate forward reshaped color grades corresponding to (or the same as) the destination color grades represented in the 2D grid.

Each set in the 2D sets of forward neural networks in the forward path may be indexed by two indices, the first of which may indicate different color spaces and the second of which may indicate different dynamic ranges. In some operational scenarios, the higher a value of the first of the two indices, the smaller a corresponding color space. Similarly, the higher a value of the second of the two indices, the smaller a corresponding dynamic range. Thus, at the end of the forward path, a color grade of the smallest color space (e.g. a color space having the smallest gamut) and the lowest dynamic range is generated or predicted.

In addition to applying the forward neural networks in the forward path, in a corresponding backward path on the encoder side, the color grade of the smallest color space and the lowest dynamic range, as generated or predicted at the end of the forward path, may be backward reshaped by 2D sets (denoted as "BackwardNet Y/Cb/Cr M−1, K−1," "BackwardNet Y/Cb/Cr M−1, K−2,". . . "BackwardNet Y/Cb/Cr M−1, 1," "BackwardNet Y/Cb/Cr M−1, 0,". . . "BackwardNet Y/Cb/Cr 0, K−1," "BackwardNet Y/Cb/Cr 0, K−2,". . . "BackwardNet Y/Cb/Cr 0, 1," "BackwardNet Y/Cb/Cr 0, 0,") of one or more backward neural networks by the video encoder as described herein to generate or predict reconstructed images of a color grade group that comprises the source color grade and other destination color grades other than the color grade of the smallest color space and the lowest dynamic range. At the end of the backward path, reconstructed images of the source color grade are generated or predicted.

In some operational scenarios (e.g., pure backward neural network, etc.), image data of the color grade of the smallest color space and the lowest dynamic range may be encoded by the video encoder into a base layer of a coded bitstream. Operational parameters for some or all of the 2D sets of backward neural networks, as generated by optimizing an overall cost function with cost portions from all color grades, may be passed/delivered with the image data of the color grade of the smallest color space and the lowest dynamic range in the coded bitstream. These operational parameters may be used by a recipient device of the coded bitstream to generate or predict reconstructed images of a color grade in the color grade group that comprises the source color grade and other destination color grades other than the color grade of the smallest color space and the lowest dynamic range. More specifically, while applying the 2D sets of backward neural networks along one dimension (e.g., corresponding to the first dimension of the 2D grid, etc.) to alter or replace the color space, applying the 2D sets of backward neural networks along other dimension (e.g., corresponding to the second dimension of the 2D grid, etc.) to increase the dynamic range. Example color spaces may include, but are not necessarily limited to only: any of: Rec. 709, P3, P5, various triangles or polygons enclosed by different sets of primary colors implemented in display devices, etc.

In some operational scenarios (e.g., hybrid forward and backward neural network, etc.), image data of a middle color grade (other than the source color grade and the destination color grade of the smallest color space and the lowest dynamic range) may be encoded by the video encoder into a base layer of a coded bitstream. Operational parameters for some or all of the 2D sets of forward and backward neural networks, as generated by optimizing an overall cost function with cost portions from all color grades, may be passed/delivered with the image data of the middle color grade in the coded bitstream. These operational parameters may be used by a recipient device of the coded bitstream to generate or predict reconstructed images of a color grade other than the middle color grade.

Figure 3E:
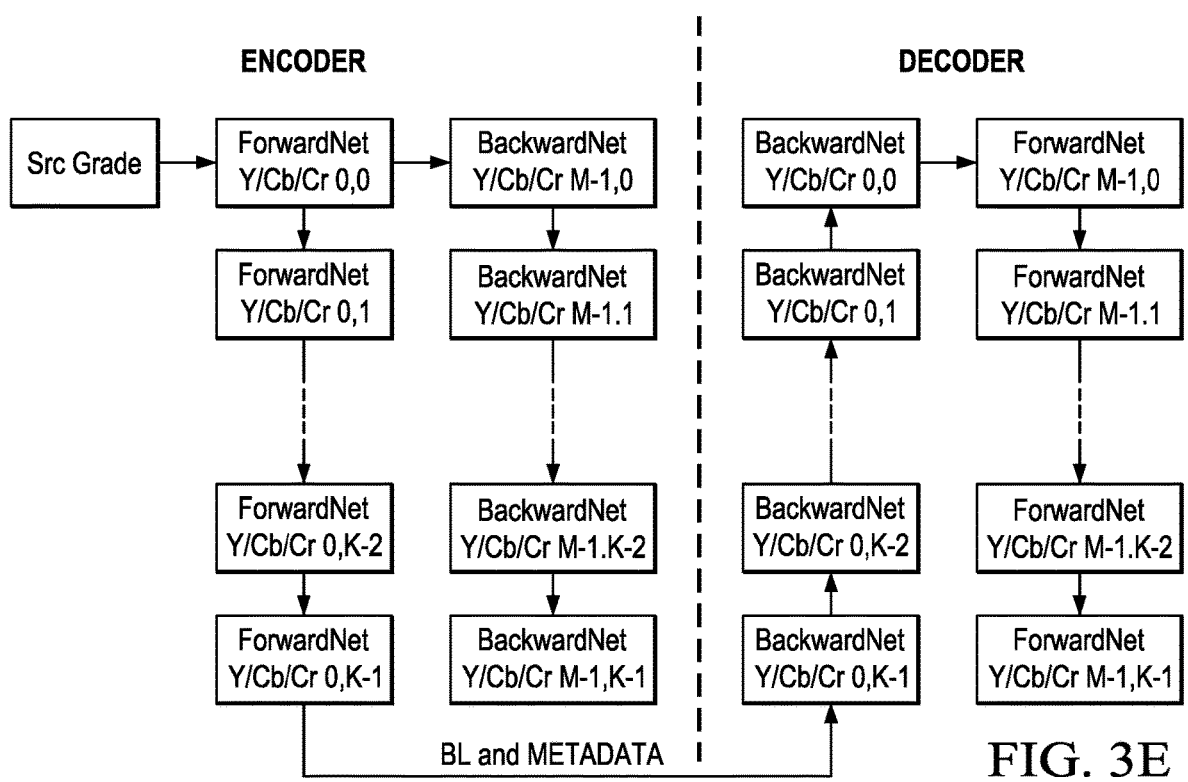

In some operational scenarios, as illustrated in FIG. 3E, image data of a color grade of the largest color space (e.g. a color space having the widest gamut) and the highest dynamic range (e.g., corresponding to the source color grade) a color grade (other than the source color grade and the destination color grade of the smallest color space and the lowest dynamic range) may be encoded by the video encoder into a base layer of a coded bitstream. Operational parameters for some or all of the 2D sets of forward or backward neural networks, as generated by optimizing an overall cost function with cost portions from all color grades, may be passed/delivered with the image data of the color grade of the largest color space and the highest dynamic range in the coded bitstream. These operational parameters may be used by a recipient device of the coded bitstream to generate or predict forward reshaped images of a color grade other than the color grade of the largest color space and the highest dynamic range. Thus, in these operational scenarios, the base layer of the coded bitstream comprises image data of the largest color space and highest dynamic range. In applying the forward or backward neural networks along one dimension, the largest color space of the coded image data is successively reduced in the generated or predicted image data; in applying the forward or backward neural networks along the other dimension, the highest dynamic range of the coded image data is successively reduced in the generated or predicted image data.

Color grades other than a selected color grade for which image data is encoded in a coded bitstream as described herein may be generated by a sequence of sets of forward or backward neural networks representing a path from the selected color grade to a desired color grade in the 2D grid. Different paths in the 2D grid may be implemented, depending on what the starting point (or the selected color graded encoded in the coded bitstream) and/or depending on which color grades one prefers to have the lowest computation to reconstruct at the decoder side.

For the purpose of illustration only, it has been described that a joint optimization framework may be implemented with forward and backward neural networks to process image data represented in a color space type of YCbCr. It should be noted that in various embodiments some or all techniques as described herein may, but are not necessarily limited to only, be applied to different color space types such as RGB (red, green, blue) color space type, IPT color space types, ICtCp color space types, and so on. Additionally, optionally or alternatively, neural networks implemented in a forward path and/or a backward path as described herein may be used to generate forward and/or backward reshaped image data represented in a different color space type (e.g., RGB, etc.) from source image data represented in a source color space type (e.g., YCbCr, etc.). Color space transformation may be implemented by the neural networks in the forward and/or backward paths and/or with one or more image processing blocks (of a video codec) outside the neural networks.

In some operational scenarios, linear segment-based structures may be used in computing/generating/including backward reshaping mappings in image metadata for the purpose of maintaining temporal stability of the image metadata. Example linear segment-based structures are described in U.S. Pat. No. 10,397,576, "Reshaping curve optimization in HDR coding," by H. Kadu and G-M. Su, the entire contents of which are hereby incorporated by reference as if fully set forth herein.

Some or all techniques as described herein can be implemented and/or performed as parts of real time operation to produce suitable color grades of video content for broadcast video applications, real time streaming applications, etc. Additionally, optionally or alternatively, some or all techniques as described herein can be implemented and/or performed as parts of time-delay or offline operation to produce suitable color grades of video content for non-real time streaming applications, cinema applications, etc.

Example Process Flows

Figure 4A:
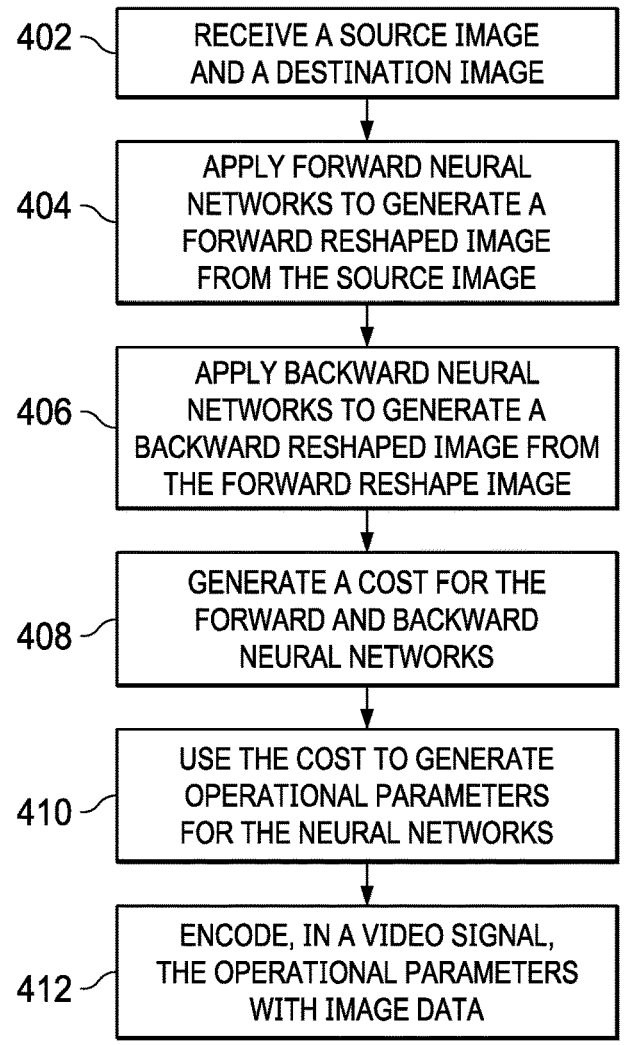
FIG. 4A and FIG. 4B illustrate example process flows.

FIG. 4A illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 402, an image processing system receives a source image of a source color grade and a destination image of a destination color grade as input to an end-to-end image mapping pipeline comprising a forward path comprising one or more forward neural networks and a backward path comprising backward neural networks.

In block 404, the image processing system applies the one or more forward neural networks in the forward path to forward reshape the source image of the source color grade to generate a forward reshaped image of the destination color grade.

In block 406, the image processing system applies the one or more backward neural networks in the backward path to backward reshape the forward reshaped image of the destination color grade to generate a backward reshaped image of the source color grade.

In block 408, the image processing system generates a cost for a neural network cost function specified for the forward path and the backward path. The cost comprises a forward cost portion computed from a first difference between the forward reshaped image and the destination image, and a backward cost portion computed from a second difference between the backward reshaped image and the source image.

In block 410, the image processing system uses the cost generated from the neural network cost function as a part of a basis to determine operational parameters for the one or more forward neural networks and for the one or more backward neural networks.

In block 412, the image processing system encodes image data of a selected color grade, generated from the forward path, in a video signal along with image metadata. The image metadata comprises at least a subset of operational parameters for a subset of the one or more forward neural networks and the one or more backward neural networks. A recipient device of the video signal is caused to use the image metadata and the image data of the selected color grade to generate reconstructed image data of a different color grade. In some operational scenarios, some or all of operations in block 412 is optional and may or may not be performed.

In an embodiment, the video signal represents a single-layer backward compatible signal.

In an embodiment, the one or more forward neural networks convert the source image of the source color grade to a plurality of forward reshaped images for a plurality of destination color grades; the one or more backward neural networks convert a forward reshaped image last generated in the forward path to a plurality of backward reshaped images for the plurality of destination color grades.

In an embodiment, the forward reshaped image of the destination color grade is the forward reshaped image last generated in the forward path.

In an embodiment, the forward reshaped image of the destination color grade is not the forward reshaped image last generated in the forward path.

In an embodiment, the image metadata comprises no operational parameters for the one or more forward neural networks.

In an embodiment, the image metadata comprises operational parameters for a mixture of the one or more forward neural networks and the one or more backward neural networks.

In an embodiment, the one or more forward neural networks reshape the source image of the source color grade into a plurality of corresponding images in a plurality of destination color grades; the plurality of destination color grades forms a two-dimensional grid with a first dimension indicating different color spaces and a second dimension indicating different dynamic ranges.

In an embodiment, the selected color grade is a selected destination color grade of a dynamic range higher than dynamic ranges of all other destination color grades generated from the forward path and of a color space higher than color spaces of all other destination color grades generated from the forward path.

In an embodiment, the selected color grade is a selected destination color grade of a dynamic range lower than dynamic ranges of all other destination color grades generated from the forward path and of a color space lower than color spaces of all other destination color grades generated from the forward path.

Figure 4B:
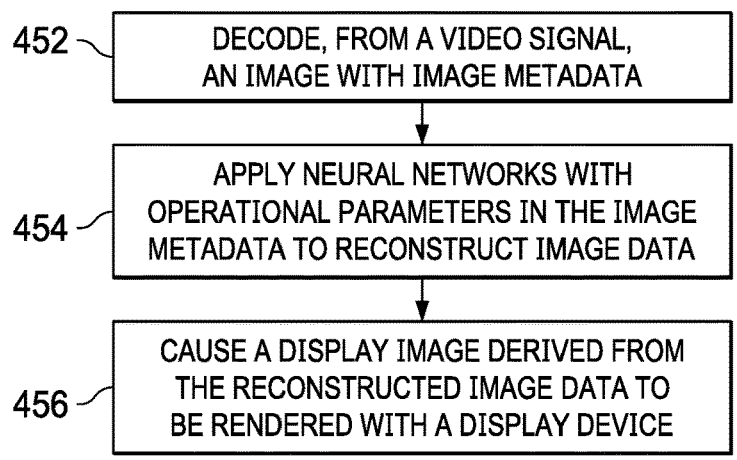

FIG. 4B illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a prediction model and feature selection system, a reverse mapping generation and application system, etc.) may perform this process flow. In block 452, a video decoding system decodes image data of a color grade, generated from a forward path implemented in an upstream video encoder, from a video signal along with image metadata. The image metadata comprises at least a subset of operational parameters for a subset of one or more forward neural networks in the forward path and one or more backward neural networks in a corresponding backward path implemented in the upstream encoder.

In block 454, the video decoding system applies the subset of the one or more forward neural networks and the one or more backward neural networks with the subset of operational parameters to the image data of the color grade to generate reconstructed image data of a different color grade.

In block 456, the video decoding system causes a display image derived from the reconstructed image of the different color grade to be rendered with a display device.

In an embodiment, the image data comprising a forward reshaped image of the color grade is selected from among a plurality of forward reshaped images generated by the one or more forward neural networks for a plurality of destination color grades; the one or more backward neural networks convert a forward reshaped image last generated in the forward path to a plurality of backward reshaped images for the plurality of destination color grades.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the inventio comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
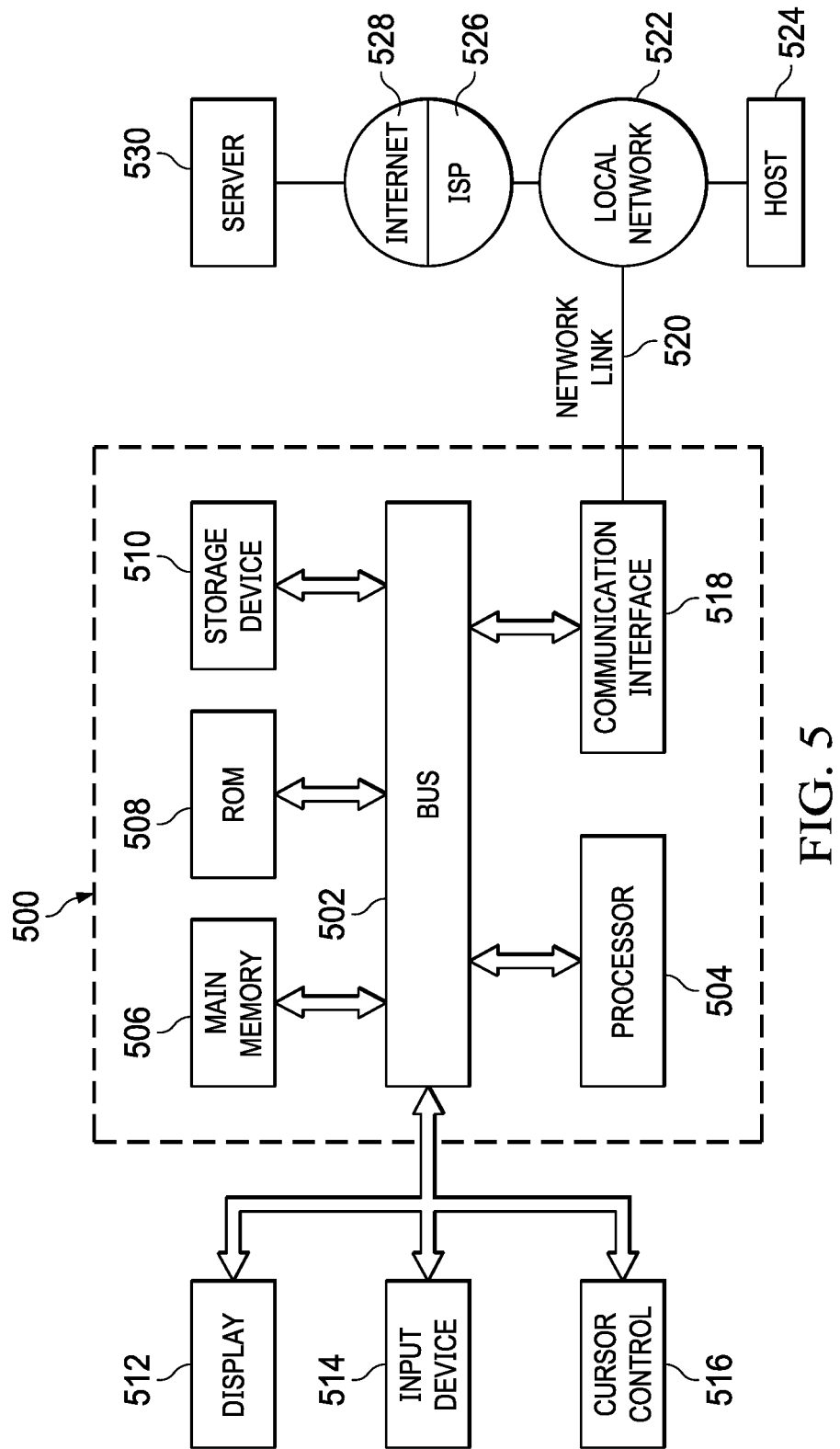
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Equivalents, Extensions, Alternatives and Miscellaneous

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method comprising:
  receiving a source image of a source color grade and a destination image of a destination color grade as input to an end-to-end image mapping pipeline comprising a forward path comprising one or more forward neural networks and a backward path comprising one or more backward neural networks;
  applying the one or more forward neural networks in the forward path to forward reshape the source image of the source color grade to generate a forward reshaped image of the destination color grade;
  applying the one or more backward neural networks in the backward path to backward reshape the forward reshaped image of the destination color grade to generate a backward reshaped image of the source color grade;
  generating a cost for a neural network cost function specified for the forward path and the backward path, wherein the cost comprises a forward cost portion computed from a first difference between the forward reshaped image and the destination image, wherein the cost comprises a backward cost portion computed from a second difference between the backward reshaped image and the source image; and
  using the cost generated from the neural network cost function as a part of a basis to determine operational parameters for the one or more forward neural networks and for the one or more backward neural networks;
  and optionally:
    encoding image data of a selected color grade, generated from the forward path, in a video signal along with image metadata, wherein the image metadata comprises at least a subset of operational parameters for a subset of the one or more forward neural networks and/or the one or more backward neural networks, wherein a recipient device of the video signal is caused to use the image metadata and the image data of the selected color grade to generate reconstructed image data of a different color grade.

EEE 2. The method of EEE 1, wherein the video signal represents a single-layer backward compatible signal.

EEE 3. The method of EEE 1 or 2, wherein the one or more forward neural networks convert the source image of the source color grade to a plurality of forward reshaped images for a plurality of destination color grades; wherein the one or more backward neural networks convert a forward reshaped image last generated in the forward path to a plurality of backward reshaped images for the plurality of destination color grades.

EEE 4. The method of any of EEEs 1-3, wherein the forward reshaped image of the destination color grade is the forward reshaped image last generated in the forward path.

EEE 5. The method of any of EEEs 1-3, wherein the forward reshaped image of the destination color grade is not the forward reshaped image last generated in the forward path.

EEE 6. The method of any of EEEs 1-5, wherein the image metadata comprises operational parameters for the one or more backward neural networks only.

EEE 7. The method of any of EEEs 1-5, wherein the image metadata comprises operational parameters for a mixture of the one or more forward neural networks and the one or more backward neural networks.

EEE 8. The method of any of EEEs 1-7, wherein the one or more forward neural networks reshape the source image of the source color grade into a plurality of corresponding images in a plurality of destination color grades; wherein the plurality of destination color grades forms a two-dimensional grid with a first dimension indicating different color spaces and a second dimension indicating different dynamic ranges.

EEE 9. The method of any of EEEs 1-8, wherein the selected color grade is a selected destination color grade of a dynamic range higher than dynamic ranges of all other destination color grades generated from the forward path and/or of a color space higher than color spaces of all other destination color grades generated from the forward path.

EEE 10. The method of any of EEEs 1-8, wherein the selected color grade is a selected destination color grade of a dynamic range lower than dynamic ranges of all other destination color grades generated from the forward path and/or of a color space lower than color spaces of all other destination color grades generated from the forward path.

EEE 11. A method comprising:
  decoding image data of a color grade, generated from a forward path implemented in an upstream video encoder, from a video signal along with image metadata, wherein the image metadata comprises at least a subset of operational parameters for a subset of one or more forward neural networks in the forward path and one or more backward neural networks in a corresponding backward path implemented in the upstream video encoder;
  applying the subset of the one or more forward neural networks and the one or more backward neural networks with the subset of operational parameters to the image data of the color grade to generate reconstructed image data of a different color grade;

causing a display image derived from the reconstructed image data of the different color grade to be rendered with a display device.

EEE 12. The method of EEE 11, wherein the image data comprising a forward reshaped image of the color grade is selected from among a plurality of forward reshaped images generated by the one or more forward neural networks for a plurality of destination color grades; wherein the one or more backward neural networks convert a forward reshaped image last generated in the forward path to a plurality of backward reshaped images for the plurality of destination color grades.

EEE 13. A system comprising a processor and configured to perform any one of the methods recited in EEEs 1-12.

EEE 14. An apparatus comprising a processor and configured to perform any one of the methods recited in EEEs 1-12.

EEE 15. A non-transitory computer-readable storage medium having stored thereon computer-executable instruction for executing a method with one or more processors in accordance with any of the methods recited in EEEs 1-12.

The invention claimed is:

1. A computer-implemented method comprising:
receiving a source image of a source color grade and a destination image of a destination color grade as input to an end-to-end image mapping pipeline comprising a forward path and a backward path,
partitioning the forward path into multiple sub-nets represented by a plurality of sets of forward neural networks, with each of the multiple sub-nets in the forward path represented by a corresponding set of forward neural networks in the plurality of sets of forward neural networks,
partitioning the backward path into multiple sub-nets represented by a plurality of sets of backward neural networks, with each of the multiple sub-nets in the backward path represented by a corresponding set of backward neural networks in the plurality of sets of backward neural networks, wherein the forward path and the backward path are concatenated together;
applying the plurality of sets of forward neural networks in the forward path to forward reshape the source image of the source color grade to generate a forward reshaped image of the destination color grade;
applying the plurality of sets of backward neural networks in the backward path to backward reshape the forward reshaped image of the destination color grade to generate a backward reshaped image of the source color grade;
computing a joint neural network cost function specified for both the forward path and the backward path, wherein the joint neural network cost function comprises a forward cost portion that computes a first difference between the forward reshaped image and the destination image, wherein the joint neural network cost function further comprises a backward cost portion that computes a second difference between the backward reshaped image and the source image; and
determining operational parameters for the plurality of sets of forward neural networks and for the plurality of sets of backward neural networks by back propagation using the joint neural network cost function; wherein the plurality of sets of forward neural networks convert the source image of the source color grade to a sequence of successive forward reshaped images for a plurality of successively lower quality destination color grades, wherein the plurality of sets of backward neural networks convert a forward reshaped image last generated in the sequence of successive forward reshaped images in the forward path to a plurality of backward reshaped images for the plurality of destination color grades, and wherein the forward reshaped image last generated in the sequence of successive forward reshaped images in the forward path and the plurality of backward reshaped images are used in the joint neural cost function.

2. The method of claim 1, further comprising:
encoding image data of a selected color grade, generated from the forward path, in a video signal along with image metadata, wherein the image metadata comprises at least a subset of operational parameters for a subset of the plurality of sets of forward neural networks and/or the plurality of sets of backward neural networks for causing a recipient device of the video signal to use the image metadata and the image data of the selected color grade to generate reconstructed image data of a color grade different from the selected color grade.

3. The method of claim 2, wherein the selected color grade is a selected destination color grade of a dynamic range higher than dynamic ranges of all other destination color grades generated from the forward path and/or of a color space larger than color spaces of all other destination color grades generated from the forward path.

4. The method of claim 2, wherein the selected color grade is a selected destination color grade of a dynamic range lower than dynamic ranges of all other destination color grades generated from the forward path and/or of a color space smaller than color spaces of all other destination color grades generated from the forward path.

5. The method of claim 2, wherein the image metadata comprises operational parameters for the plurality of sets of backward neural networks only.

6. The method of claim 2, wherein the image metadata comprises operational parameters for a mixture of the plurality of sets of forward neural networks and the plurality of sets of backward neural networks.

7. The method of claim 2, wherein the video signal represents a single-layer backward compatible signal.

8. The method of claim 1, wherein the forward reshaped image of the destination color grade is the forward reshaped image last generated in the forward path.

9. The method of claim 1, wherein the forward reshaped image of the destination color grade is not the forward reshaped image last generated in the forward path.

10. The method of claim 1, wherein the plurality of sets of forward neural networks reshape the source image of the source color grade into a plurality of corresponding images in a plurality of destination color grades; wherein the plurality of destination color grades forms a two-dimensional grid with a first dimension indicating different color spaces and a second dimension indicating different dynamic ranges.

11. The method of claim 1, wherein the joint neural network cost function is formed as weighted combination of the forward cost portion and the backward cost portion by weighting factors.

12. The method of claim 11, wherein the weighting factors comprise a source color grade weighting factor corresponding to the source color grade and a destination color grade weighting factor corresponding to the destination color grade.

13. The method of claim 1, further comprising:

decoding image data of a destination color grade, generated from a plurality of sets of forward neural networks in a forward path implemented in an upstream video encoder, from a video signal along with image metadata, wherein the image metadata comprises at least a subset of operational parameters for a subset of the plurality of sets of forward neural networks in the forward path and a plurality of sets of backward neural networks in a corresponding backward path implemented in the upstream video encoder;

applying the subset of the plurality of sets of forward neural networks and the plurality of sets of backward neural networks with the subset of operational parameters to the image data of the destination color grade to generate reconstructed image data of a color grade different from the destination color grade;

causing a display image derived from the reconstructed image data of the different color grade to be rendered with a display device, wherein the image data comprising a forward reshaped image of the destination color grade is selected from among the sequence of successive forward reshaped images generated by the plurality of sets of forward neural networks for the plurality of successively lower quality destination color grades.

14. A system comprising a processor and configured to perform the method recited in claim 1.

15. A non-transitory computer readable storage medium having stored thereon computer executable instruction for executing by one or more processors the method recited in claim 1.

* * * * *